United States Patent
Grable et al.

(10) Patent No.: US 12,162,378 B2
(45) Date of Patent: Dec. 10, 2024

(54) STRIKER LOCKING LATCH ASSEMBLY INCORPORATING A CINCHING CAM AND HOOK FOR COMPRESSING THE STRIKER AGAINST OUTER SUPPORT PLATES

(71) Applicant: BAE Industries, Inc., Auburn Hills, MI (US)

(72) Inventors: David M. Grable, Rochester Hills, MI (US); Joel Hudson, South Lyon, MI (US); Reed Lawless, Rochester Hills, MI (US)

(73) Assignee: BAE INDUSTRIES, INC., Auburn Hills, MI (US)

(*) Notice: Subject to any disclaimer, the term of this patent is extended or adjusted under 35 U.S.C. 154(b) by 0 days.

(21) Appl. No.: 18/231,376

(22) Filed: Aug. 8, 2023

(65) Prior Publication Data
US 2023/0382272 A1    Nov. 30, 2023

Related U.S. Application Data

(63) Continuation-in-part of application No. 17/519,654, filed on Nov. 5, 2021.

(60) Provisional application No. 63/111,169, filed on Nov. 9, 2020.

(51) Int. Cl.
*B60N 2/005*    (2006.01)

(52) U.S. Cl.
CPC .................. *B60N 2/005* (2013.01)

(58) Field of Classification Search
CPC ..... B60N 2/005; B60N 2/01583; E05B 77/36; E05B 85/26; E05B 85/243; E05B 2015/0448; E05B 2015/0486; E05C 3/24
USPC ................................ 297/378.12, 378.13
See application file for complete search history.

(56) References Cited

U.S. PATENT DOCUMENTS

| | | | |
|---|---|---|---|
| 3,188,126 A | 6/1965 | Krause | |
| 4,988,134 A | 1/1991 | Vidwans et al. | |
| 5,975,596 A | 11/1999 | Rogers, Jr. et al. | |
| 6,213,525 B1 | 4/2001 | Nicola | |
| 7,044,552 B2 | 5/2006 | Müller et al. | |
| 7,762,605 B2 | 7/2010 | Otsuka et al. | |
| 7,954,898 B2 | 6/2011 | Van De Geer et al. | |
| 8,029,030 B2 | 10/2011 | Shimura et al. | |
| 8,128,135 B2 | 3/2012 | Maeta et al. | |

(Continued)

*Primary Examiner* — Christine M Mills
*Assistant Examiner* — Yahya Sidky
(74) *Attorney, Agent, or Firm* — Dinsmore & Shohl LLP

(57) ABSTRACT

A striker locking latch assembly having a mounting bracket and a cover plate secured together by first and second bushings to define a package interior. The first bushing rotatably supports a structural cam and a cinching cam, with the second bushing rotatably supporting a hook adapted to engage the striker when seated within an underside cavity defined between the bracket and plate. A torsional spring biases the cinching cam in a first direction for maintaining a first biasing contact with the hook engaging with the striker. A coil spring extends between the structural cam and a rotationally offset location of the hook such that, and upon the structural cam being pivoted into engagement with the cinching cam and against the first biasing component, continued pivotal actuation of the structural cam and cinching cam causes the second biasing component to pivot the hook out of contact with the striker in a second release position, at which the cinching cam establishes a second biasing contact with the hook.

17 Claims, 16 Drawing Sheets

(56) References Cited

U.S. PATENT DOCUMENTS

| | | | |
|---|---|---|---|
| 8,851,548 B2* | 10/2014 | Pacolt | B60N 2/01583 |
| | | | 296/65.03 |
| 9,987,956 B2 | 6/2018 | Vedder et al. | |
| 10,024,083 B2 | 7/2018 | Bejune et al. | |
| 10,358,071 B2 | 7/2019 | Rapedius et al. | |
| 10,500,983 B2* | 12/2019 | Mueller | B60N 2/366 |
| 10,647,236 B2 | 5/2020 | Kish et al. | |
| 10,767,397 B2 | 9/2020 | Ottino et al. | |
| 11,110,819 B2 | 9/2021 | Barzen et al. | |
| 11,117,494 B2 | 9/2021 | Vedder et al. | |
| 11,370,332 B2 | 6/2022 | Pejathaya | |
| 11,377,880 B2 | 7/2022 | Mihail | |
| 2005/0121922 A1 | 6/2005 | Cetnar et al. | |
| 2005/0269854 A1 | 12/2005 | Lutzka et al. | |
| 2006/0125273 A1* | 6/2006 | Lutzka | B60N 2/01583 |
| | | | 296/65.03 |
| 2008/0211281 A1 | 9/2008 | Grable et al. | |
| 2009/0056393 A1* | 3/2009 | Otsuka | B60N 2/01583 |
| | | | 70/205 |
| 2011/0210568 A1 | 9/2011 | Williams | |
| 2012/0181842 A1* | 7/2012 | Gleason | B60N 2/22 |
| | | | 297/463.1 |
| 2014/0265499 A1* | 9/2014 | Pacolt | B60N 2/366 |
| | | | 297/337 |
| 2016/0245000 A1 | 8/2016 | Ottino et al. | |
| 2020/0165844 A1* | 5/2020 | Ottino | E05B 81/06 |

* cited by examiner

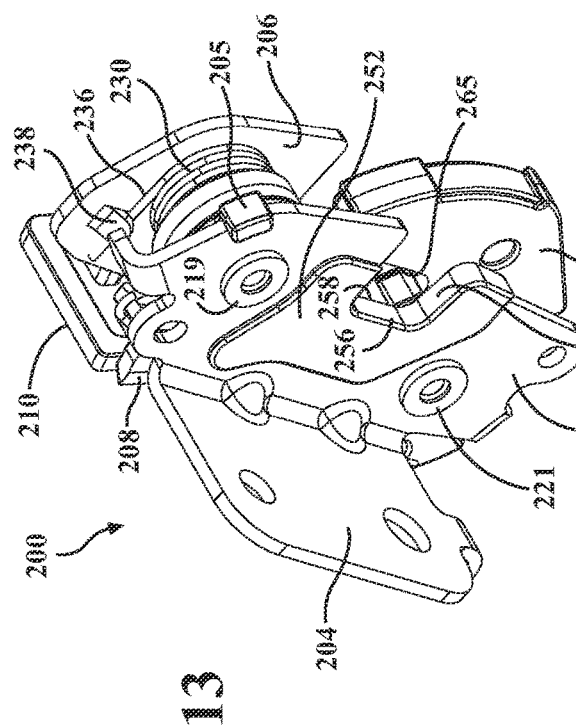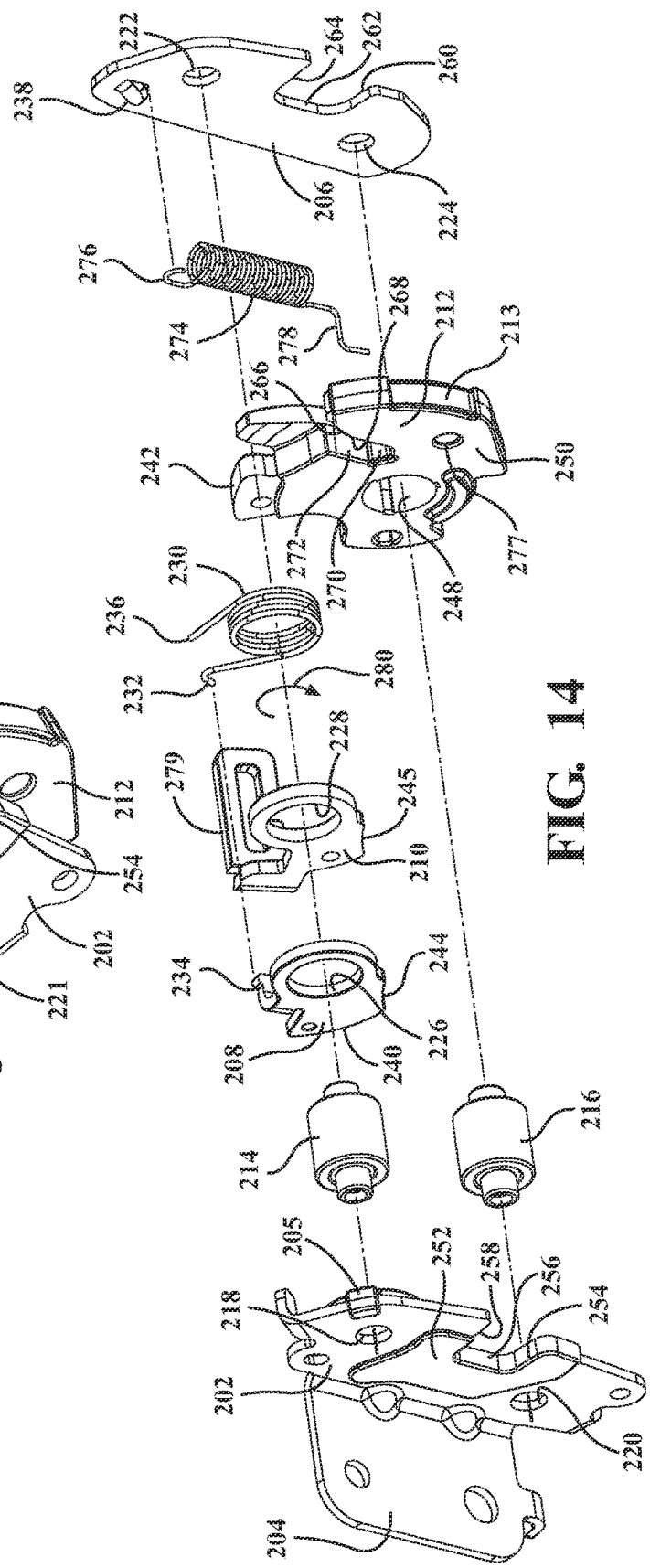

STRIKER LOCKING LATCH ASSEMBLY INCORPORATING A CINCHING CAM AND HOOK FOR COMPRESSING THE STRIKER AGAINST OUTER SUPPORT PLATES

CROSS REFERENCE TO RELATED APPLICATIONS

The present application is a continuation in part of U.S. Ser. No. 17/519,654 filed Nov. 5, 2021. The '654 application claims the priority of U.S. Ser. No. 63/111,169 filed Nov. 9, 2020.

FIELD OF THE INVENTION

The present invention relates generally to a striker locking latch assembly. More specifically, the present invention discloses a cinching cam and hook incorporated into a striker locking latch assembly, which compensates for variations in striker diameter, orientation or position and in order to avoid instances of buzz, squeak or rattle in use.

BACKGROUND OF THE INVENTION

The prior art is documented with examples of vehicle seat engagement mechanism in which a suitably configured latch engages a floor or wall mounted striker in order to secure the seat in a use configuration. Striker locking latches are common in the automotive industry and by which the latch must lock tightly onto the striker in order to prevent any striker movement, as any striker movement may create an objectionable buzz, squeak or rattle condition.

A first example of a known vehicle seat latch assembly for use with a vehicle seat pivotally mounted to a vehicle floor for engaging a striker is depicted in US 2005/0269854 to Lutzka et al. Of note, a striker engaging latch plate and an anti-chuck plate are pivotally mounted in overlapping fashion relative to a planar support location. A linkage member is secured to each of the latch plate and anti-chuck plate for pivoting each in opposite directions during disengagement from the striker bar.

Other references of note include U.S. Pat. No. 10,500,983, to Mueller, which teaches a locking unit for a vehicle seat including a pawl which is mounted pivotally about a pivot axis between an open position and a closed position and has a retaining contour for securing a locking pin in the closed position. At least one claw is mounted pivotally about the same pivot axis in a manner offset in the axial direction with respect to the pawl. The claw has a closing contour and the pawl is pivotable from open to closed positions by the closing contour being acted upon by the locking pin.

U.S. Pat. No. 7,044,552, to Muller, teaches another locking mechanism for a vehicle seat, in particular for a motor vehicle seat, having a pivotably mounted pawl for locking to a mating element and having at least one securing element which secures a locked state by interaction with a first functional surface of the pawl, and secures an opened state by interaction with a second functional surface of the pawl. The securing element exerts an opening moment on the pawl in the opened state.

U.S. Pat. No. 3,188,126 to Krause teaches a self-adjusting latch structure having an interlock provided by an elongated striker in a slotted plate. An adjustable locking range is provided which is coincidental with the length of an open slot in the plate and in which the working latches are positioned to have engaging ends moved to a common slot located in a plate to provide interlock.

U.S. Pat. No. 10,024,083 to Bejune et al. teaches a vehicle door latch with inertial lock and including a fork-bolt configured to engage a striker. A lock mechanism disconnects an exterior door handle from the latch mechanism when locked. A lock lever includes a center of mass that is spaced from an axis of rotation whereby the lock lever rotates and locks the latch mechanism in the event of a side impact.

US 2005/0121922 to Cetnar et al. discloses a latch having a releasable cinching mechanism including a housing and a ratchet pivotally mounted to the housing. The ratchet is operable to move between an unlatched position, a secondary latched position, and a primary latched position. A release lever is pivotally mounted to the housing and operatively connects to the ratchet for unlatching the ratchet from either of the secondary or primary latched positions. The operative connection has a guide pin and a cinching lever has a cam surface that slidingly engages the guide pin. The cam surface defines a predetermined path of travel as the cinching lever is drivingly reciprocated in a cinching cycle. The predetermined path enables the cinching lever to be initially out of the path of travel of the ratchet, to engage the ratchet when the ratchet is in the secondary position and drivingly rotating the ratchet to the primary latched position, and thereafter move out of the path of travel of the ratchet. In this fashion, the guide pin moves to urge the cinching lever out of the predetermined path when the release lever is operated in unlatching the latch.

SUMMARY OF THE PRESENT INVENTION

The present invention seeks to overcome many of the disadvantages of the prior art and discloses a striker locking latch assembly which compensates for variations in striker diameter, orientation or position and in order to avoid instances of buzz, squeak or rattle in use. The latch assembly including a mounting bracket and a hook pivotally supported to a first location of the mounting bracket, the hook having a striker receiving surface. A cinching cam is pivotally supported at a second location of the mounting bracket and has a cam locking surface profile which extends along an arc radially offset from a center point of rotation of the cinching cam, the locking surface profile contacting a surface location of the hook.

A first biasing component (such as without limitation a torsional spring) influences the cinching against the hook and, in turn, into engagement with the striker in a first engaged position. A structural cam is pivotally supported to the mounting bracket so as to overlap the cinching cam.

A second biasing component (such as further without limitation a coil extension spring) extends between a pivotally offset location of the structural cam and the hook. Releasing of the hook from the striker is preceded by the structural cam pivoted into engagement with the cinching cam, with continued collective pivotal actuation of the structural cam and cinching cam counter biasing the first biasing component while increasing the bias of the second biasing component to cause the hook to pivot out of contact with the striker. At this point, a user pivots the seat upon which the latch assembly is mounted away from the fixed striker.

Additional features include a cover plate spatially separated from the mounting bracket and supports the first biasing component (again such as a torsional spring), the cover plate sandwiching the hook, cinching cam and structural cam therebetween. A bushing supports the first biasing component against an exterior surface of the cover plate.

The surface location of the hook further includes an edge protuberance, against which is contacted the locking surface profile of the cinching cam. A first rivet extends between the mounting bracket and the cover plate and seats through an interior aperture of the hook.

A second rivet extends between the mounting bracket and the cover plate for rotatably supporting both the cinching cam and the structural cam. A spring rivet secured to the structural cam to define said pivotally offset location. Any of a cable, wire loop or handle is provided to secure to the structural cam for actuating the latch assembly to the second release position.

Other features include the cinching cam being urged in a closing direction by the torsion spring until making contact with the mating surface of the hook, the hook being urged in a closing direction pivotally about the hook pivot until contacting the striker, with a geometry of the cinching cam then creating a locking force through a cam angle defined therein, preventing the striker from urging the hook and, subsequently the cam, in an opening direction and subsequently urging the cinching cam to in an opening direction to the release position. The geometry of the cam angle incorporates multiple tangential arcs which are located eccentrically from each other and eccentric to the cinching cam pivot to create a consistent lock angle and forces necessary to maintain the hook locked against the striker.

BRIEF DESCRIPTION OF THE DRAWINGS

Reference will now be made to the attached drawings, when read in combination with the following detailed description, wherein like reference numerals refer to like parts throughout the several views, and in which:

FIG. 13 is an assembled perspective of a striker locking latch assembly according to a further non-limiting embodiment of the present invention including an "L" bracket shaped structural cam with direct release strap attachment;

FIG. 14 is an exploded view of the striker locking latch assembly of FIG. 13;

DETAILED DESCRIPTION OF THE PREFERRED EMBODIMENTS

With reference to the attached illustrations, the present invention discloses a cinching cam and hook incorporated into a striker locking latch assembly which compensates for variations in striker diameter, orientation or position and in order to avoid instances of buzz, squeak or rattle in use. As will be further described in reference to the various illustrations, the latch assembly provides interchangeable parts and multiple configurations to allow for various mounting environments and release methods (including both cable and strap release versions).

As will be further described, the latch assembly further specifically incorporates an overlapping relationship established between a locking surface of an actuating cinching cam for engaging a rotatable hook in a manner which, along with a unique striker feature incorporated into the hook, collectively allows for increased angular travel of the cinching cam. The hook can include, without limitation, a plastic over-molding for the striker feature as well as opposing the cinching cam locking surface, and such as which accommodates for greater variance in striker diameter, orientation or position due to production tolerances. Additional overmolding of the mounting bracket, such along the boundary defining the striker receiving pathway, is provided.

Figure 1:
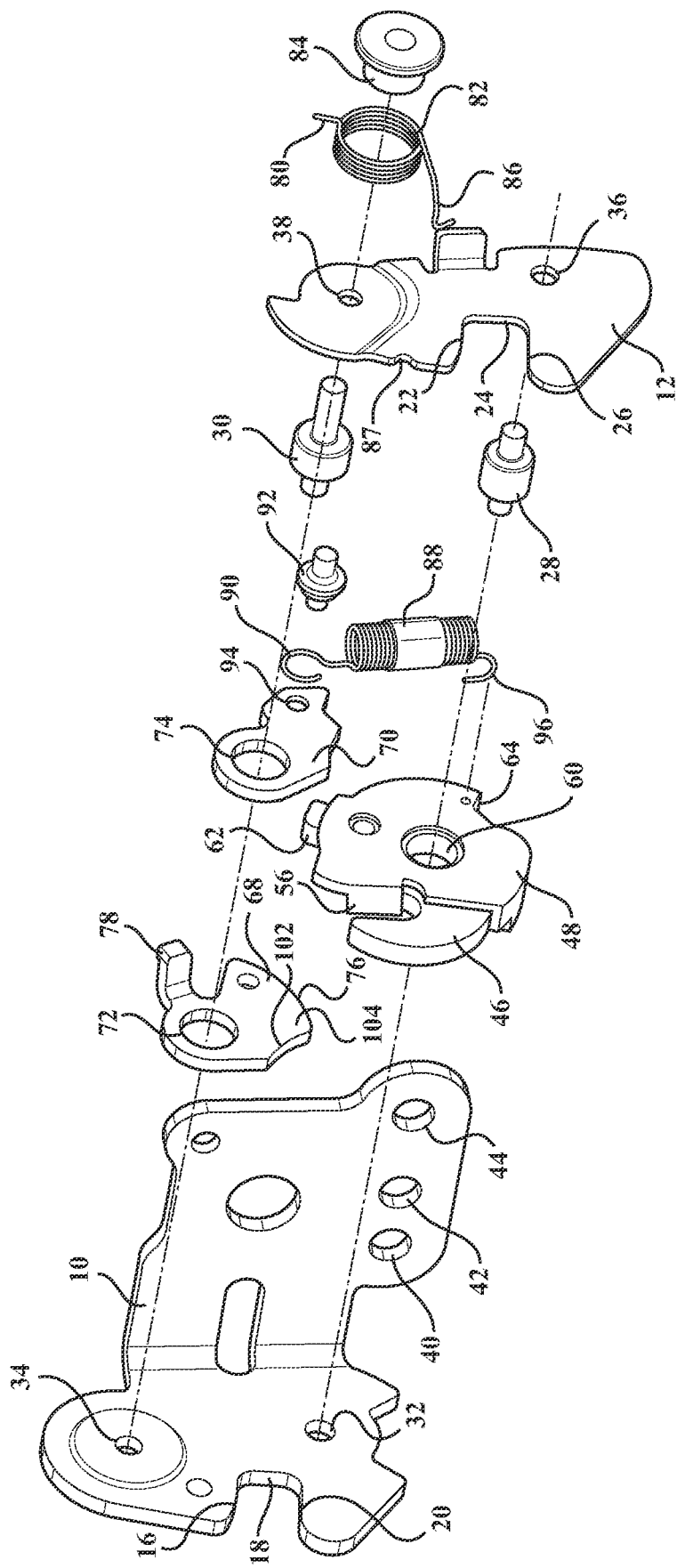
FIG. 1 is an exploded view of the striker locking latch assembly according to a non-limiting embodiment of the present invention.

Referring initially to FIG. 1, an exploded view is shown of the striker locking latch assembly according to a non-limiting embodiment of the present invention and which includes a sandwich arrangement of components (such as which can be constructed of a stamped steel or other suitable material), including each of an innermost mounting bracket 10 and an outermost cover plate 12. Each of the mounting bracket 10 and cover plate 12 further exhibit an arcuate multi-sided recessed profile which receives there between a striker 14 (see FIG. 2 et seq.) which is in turn fixedly mounted to a given location within a vehicle interior (such as further without limitation.

The bracket 10 includes interconnected recess defining surfaces 16, 18 and 20, with the cover plate 12 likewise having recess defining surfaces 22, 24, and 26 which align with the recessed surfaces of the mounting bracket in order to define a pathway for receiving the central extending location of the striker 14. The bracket 10 and cover plate 12 also each include aligning circular aperture locations (each defined by inner extending and closed perimeter surfaces) for receiving a pair of rivets 28 and 30, with mounting bracket 10 including aperture receiving locations 32 and 34 and cover plate 12 aligning aperture receiving locations 36 and 38. The bracket 10 as best shown in FIG. 1 further includes an arrangement of apertures (see for example at 40, 42, 44, et seq.) for mounting the bracket (via bolts or the like) to a desired interior location such as against a seat bottom underside or seat back (not shown), for engaging the striker 14 mounted at a static location within the vehicle (such as without limitation any of a wall or floor location).

Figure 4:
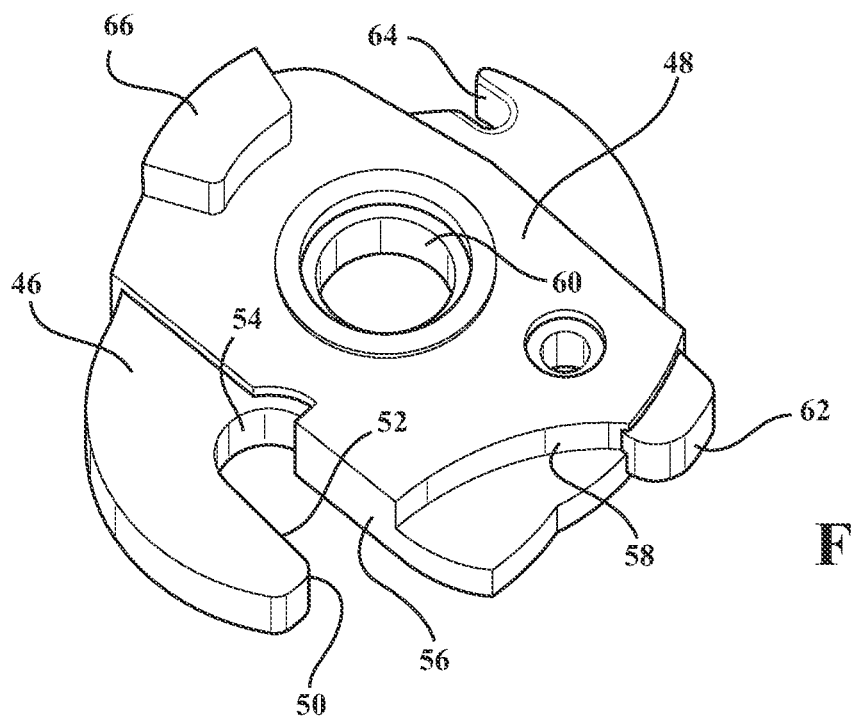
FIG. 4 is an illustration of the hook and illustrating the plastic over-molding which also provides the striker receiving surface.

A hook 46 is provided and which, by non-limiting example, can include a plasticized over mold 48 covering a substantial surface area thereof. As best shown in FIG. 4, the hook 46 exhibits a series of configured and recessed interior surfaces (see entranceway location 50, inward extending surface 52 and curved inner surface 54). The plastic over mold further exhibits a striker receiving surface 56 which opposes the inward extending surface 52 and which, upon rotation of the hook 46, extends within an open area corresponding with the recessed defining surfaces in the bracket 10 and cover plate 12.

The over-molded plastic material 48 upon the hook 46 also includes a recessed edge profile 58 (see again as best shown in FIG. 4) which, as will be subsequently described, opposes an aligning cinching cam locking surface as it travels in pivotally rotating fashion. A central aperture 60 of the hook 46 also receives the rivet 28 as shown in FIG. 1 for rotatably supporting the hook, with opposite extending ends of the rivet 28 seating within aligning apertures 32 and 36 of the bracket 10 and cover plate 12.

The hook 46 includes an edge protuberance shown at 62, which is offset from the central aperture 60 of the hook, and provides an abutment location of the cinching cam locking surface for rotating the hook during rotation of the cinching cam (described below at 68) to influence the hook in its rotary cinching engagement of the striker 14. Other features include a recessed notch location 64 which, as will be further described, is engaged by an end 96 of an extension spring 88. A further projecting portion 66 of the overmold is depicted and provides lateral support to the hook 46 in combination with the lateral projecting mounting rivet 28 extending through the central aperture 60.

Each of a cinching cam 68 and a structural cam 70 are depicted and provide each of engagement and release functions for the rotating hook 46. The cinching cam 68 includes an interior pivotally supporting aperture 72, with the structural cam 70 having a similar and aligning aperture 74 through which extends the rivet 30 for supporting the cams 68 and 70 in inter-pivotal and overlapping fashion, with opposing ends of the rivet 30 respectively engaging through the aligning aperture receiving locations of the bracket 10 (at 34) and the cover plate (at 38).

Figure 2:
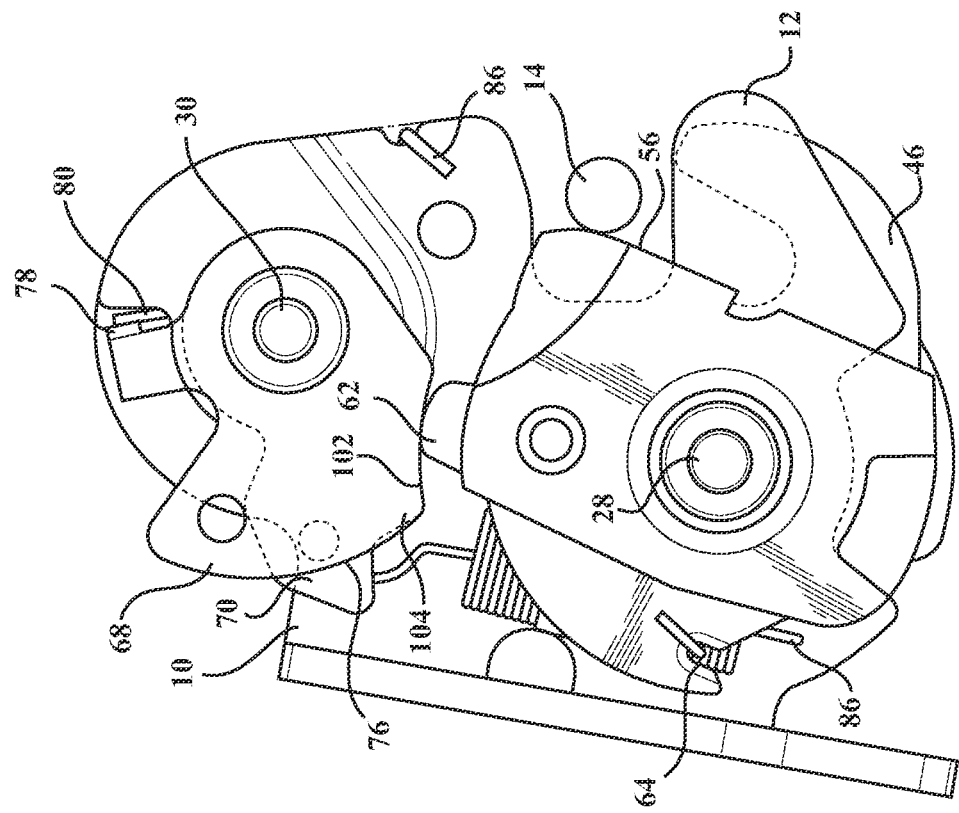
FIG. 2 is a partially transparent view of the latch assembly with the outer cover plate removed and showing the striker receiving surface configured in the rotatable hook.

The cinching cam 68 exhibits an exterior arcing surface 76 (see as best shown in FIG. 2) which is offset from the a center of rotation defined by the aperture 72 and defines a cam locking surface when contacting and pivotally engaging relative the edge protuberant location 62 of the hook 46. This can also include the offset arcing surface 76 configured as a series of tangential arcs, which are incorporated to reduce the variation in the locking angle created thereby.

A radial extending portion 78 of the cinching cam 68 is depicted and against which is biased a first extending leg or end 80 of a first biasing component in the form of a torsion spring 82. The torsion spring 82 in turn is supported upon an exterior surface of the cover plate 12 and so that a center axis extending through an interior of the torsion spring aligns with the aperture receiving location 38 and is held in place by an attachment bushing 84. A second opposite extending end or leg 86 of the torsion spring 82 engages an edge recess location 87 of the cover plate 12 so that the first extending leg 80 biases the radial portion 78 of the cinching cam 68 in the striker locking (or counter clockwise) direction.

A second biasing component is provided as the extension or coil spring 88 (see again FIG. 1 as previously described) and includes a first extending and curled end 90 which is engaged by a spring rivet 92, in turn engaging an interior aperture location 94 of the structural cam 70 offset from the pivotally supported aperture 74. The second opposite extending and curled leg 96 of the compression spring 88 again engages the recessed notch location 64 configured in the exterior of the hook 46.

Figure 10:
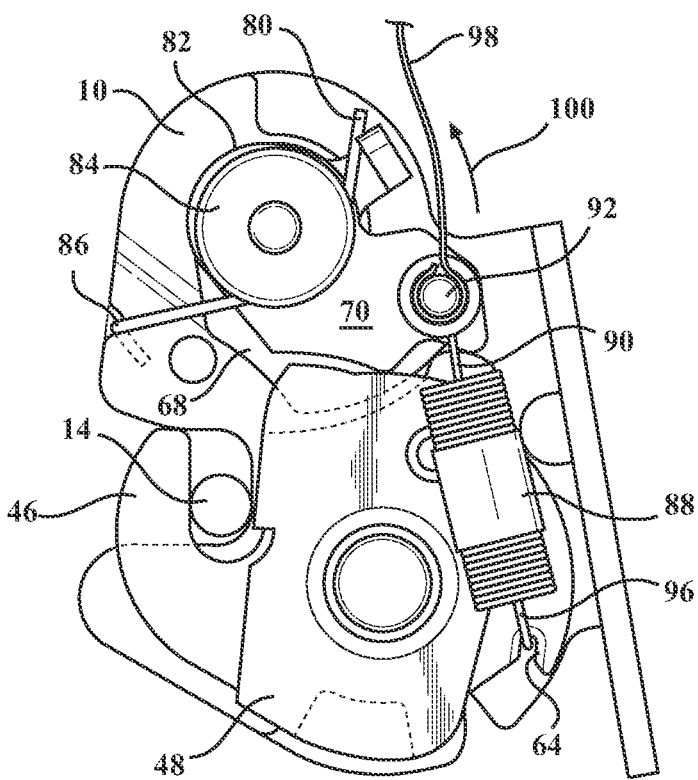
FIG. 10 is a further ninety rotated plan view of the assembled striker latch locking assembly in FIG. 9 in a reversing fashion to that illustrated in FIG. 8.

A release mechanism or tool is provided and can include any of a wire formed loop, cable 98 or other handle mechanism which is connected to the spring rivet 92 and which, upon extending in the direction of arrow 100 as shown in FIG. 10, rotates the structural cam 70 in a counterclockwise direction. At this point, an offset edge location of the structural cam 70 engages the radial extending portion 78 of the cinching cam 68 such that, upon continued rotation, the structural cam rotates the cinching cam in order to counter-bias the first biasing component (torsional spring) 82, simultaneous with tensioning the second biasing component (coil extension spring) 88. Upon the biasing force of the torsional spring 82 being exceeded by the counter bias induced pulling force of the extension (coil)

spring 88, the hook 46 is then pivoted in a reverse striker release (counter-clockwise) direction, as depicted in the orientation of FIG. 10 and at which point, upon releasing the striker 14, the hook and related components are pivoted out of contact with the striker.

In operation, the cinching cam 68 is mounted pivotally about the cam pivot 30 and is urged in a closing direction by the first (torsion) spring 82 until making contact with the mating surface of the hook 46 (see again protrusion 62 and communicating recessed edge profile 58). From the force introduced rotationally by the cinching cam 68, the hook 46 is then urged in a closing direction pivotally about the hook pivot 28 until contacting the striker 14 in a re-engagement condition. The second (coil) spring 88 operates to influence the hook 46 to an open position away from the striker 14 and, when opened, maintains the hook in the open position so that it is ready to receive the striker 14 upon re-latching, as well as to return the structural cam 70 to a locked position.

Without limitation, alternate envisioned variants can operate with the use of a single biasing component (again including but not limited to the torsional spring 82 defined herein). It is also envisioned that the second biasing component, again shown by extensible spring 88, can be reconfigured or otherwise constructed beyond that shown in order to assist in re-latching the hook against the striker in the engaged position.

As also previously described, the geometry of the cinching cam 68 creates a locking force through the engineered cam angle associated with the exterior locking surface, thereby preventing the striker 14 from urging the hook 46 in an opening direction and subsequently urging the cinching cam 68 in an open direction. The aforementioned engineered cam angle is maintained over a large angular range by the engineered cam locking surface 76 exhibiting the multiple tangential arcs located eccentrically from each other and which are eccentric to the cam pivot 30 in a manner to create a consistent lock angle and forces necessary to keep the mechanism locked.

Referring now to FIG. 2, a partially transparent view is shown of the latch assembly with the outer cover plate 12 removed and showing the striker receiving surface configured in the rotatable hook 46. In this position, the cinching cam 68 depicted in a clockwise retracted position and by which the edge protuberance 62 of the hook 46 contacts a further outer surface profile 102 of the cinching cam 68 which interconnects with and succeeds the locking surface 76 at transition location 104.

Figure 3:
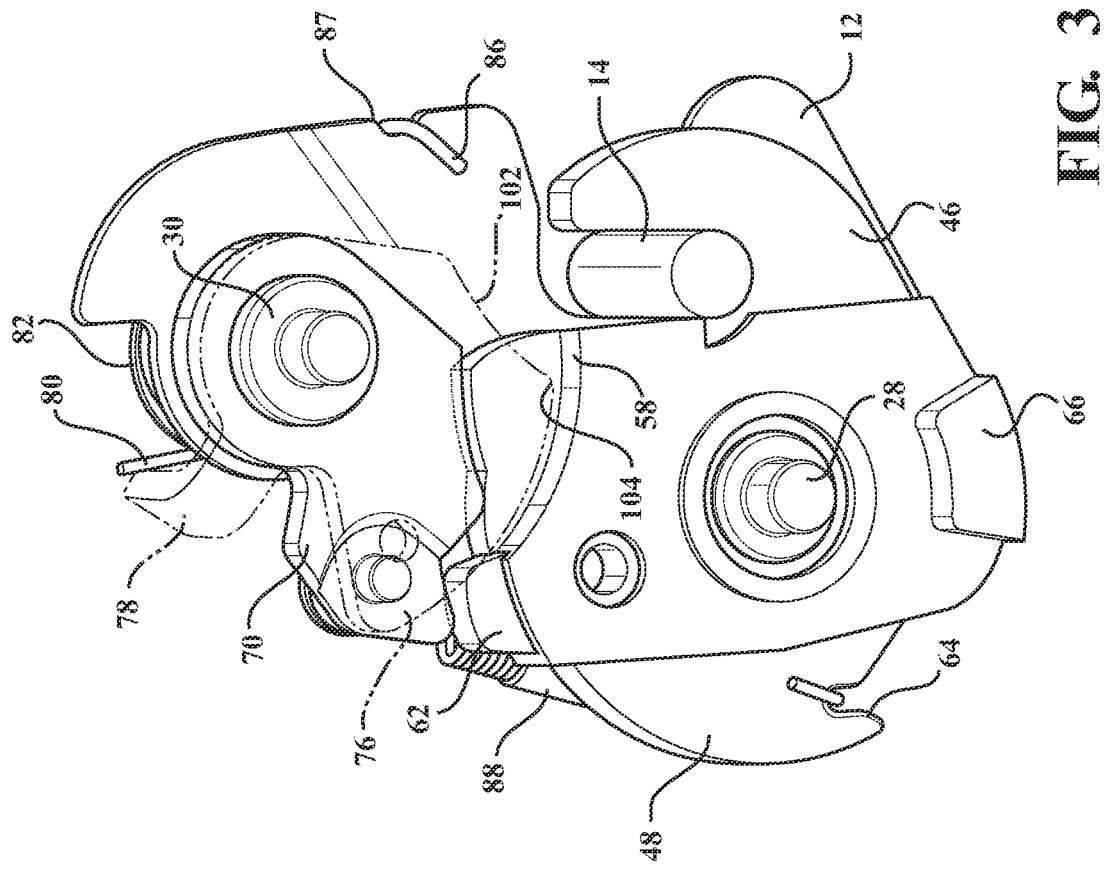
FIG. 3 is a similar illustration to FIG. 2 with the mounting plate also removed and showing axial interaction of the cinching cam locking surface with an over-molded surface of the hook.

FIG. 3 is a similar illustration to FIG. 2, with the mounting plate 10 removed and showing axial interaction of the cinching cam locking surface 76 arrayed in the locking direction, with the recessed edge profile 58 within the over-molded surface of the hook 46. The cinching cam locking surface 76 simultaneously displaces against the edge protuberance 62.

Figure 5:
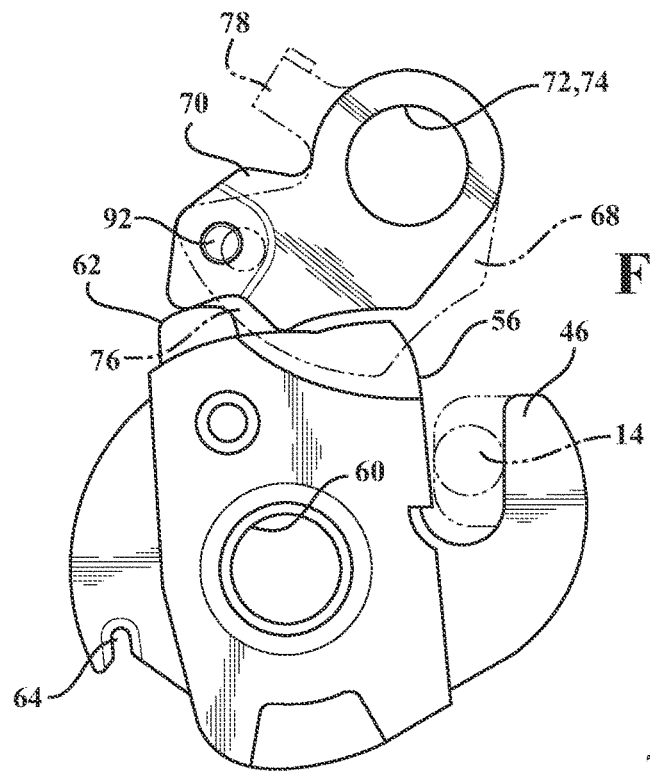
FIGS. 5-7 present a succession of side plan views similar to FIG. 3 and showing a sub-combination of the hook, cinching cam and structural cam in each of nominal design, maximum cinch, and minimal cinch positions, respectively.
Figure 6:
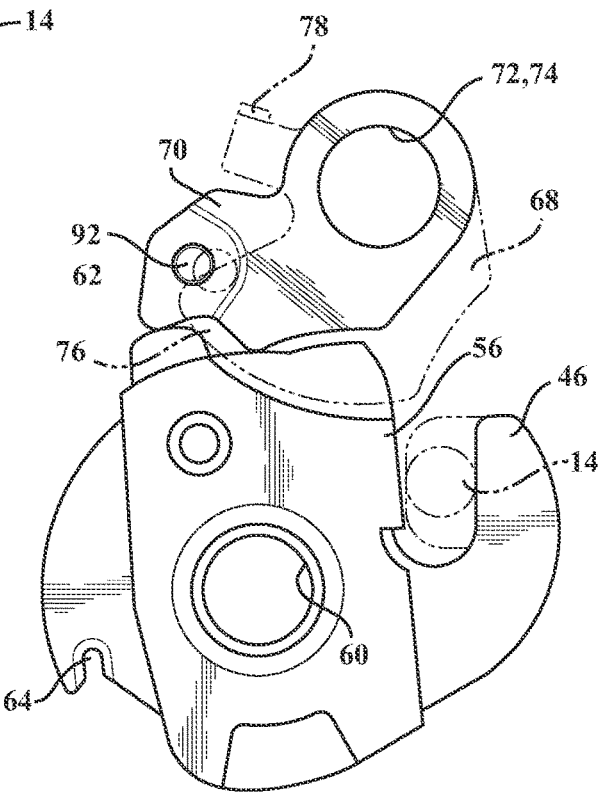
Figure 7:
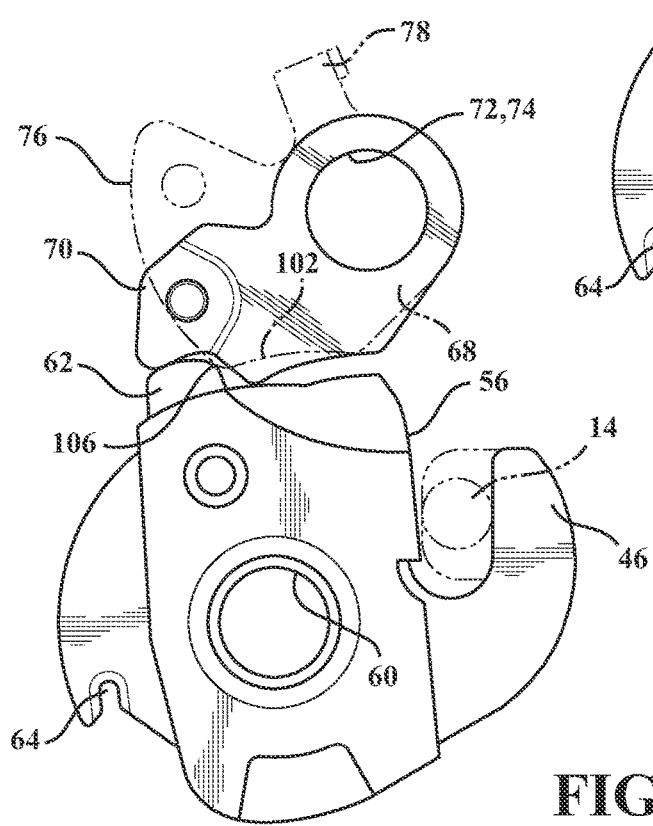

FIGS. 5-7 present a succession of side plan views similar to FIG. 3 in each of nominal design (FIG. 5), maximum cinch (FIG. 6), and minimal cinch (FIG. 7) positions, respectively, showing a sub-combination of the hook 46, cinching cam 68 and structural cam 70. As previously indicated, the striker locking latch provides for accommodating striker designs of varying diameter, orientation or position and by which the degree of rotation of the cinching cam 68 is dictated in part by configuration of the striker receiving surface 56 relative to the striker 14 in combination with the displacing profile of the cinching cam locking surface 76 relative to the protuberant edge portion 62 of the hook 46.

In this fashion, the cinching cam 68 in FIG. 6 pivots to a maximum counterclockwise position for cinching the hook 46 for engagement with a smaller striker configuration 14. Reciprocally, the cinching cam 68 in the minimal cinching position of FIG. 7 achieves striker locking at an initial location (at 106) of the locking surface 76 in contact with the protuberant edge location 62 of the hook 46 (this corresponding to larger diameter sized striker).

Figure 8:
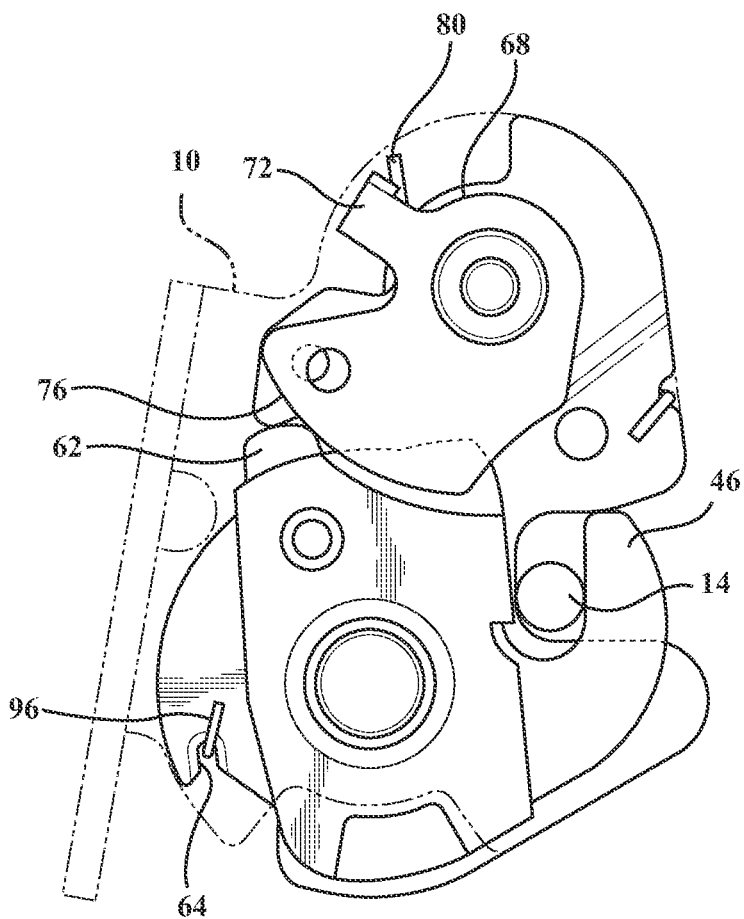
FIG. 8 corresponds to the latch and cinching cam position in FIG. 3 in a plan view representation similar to FIG. 2.
Figure 9:
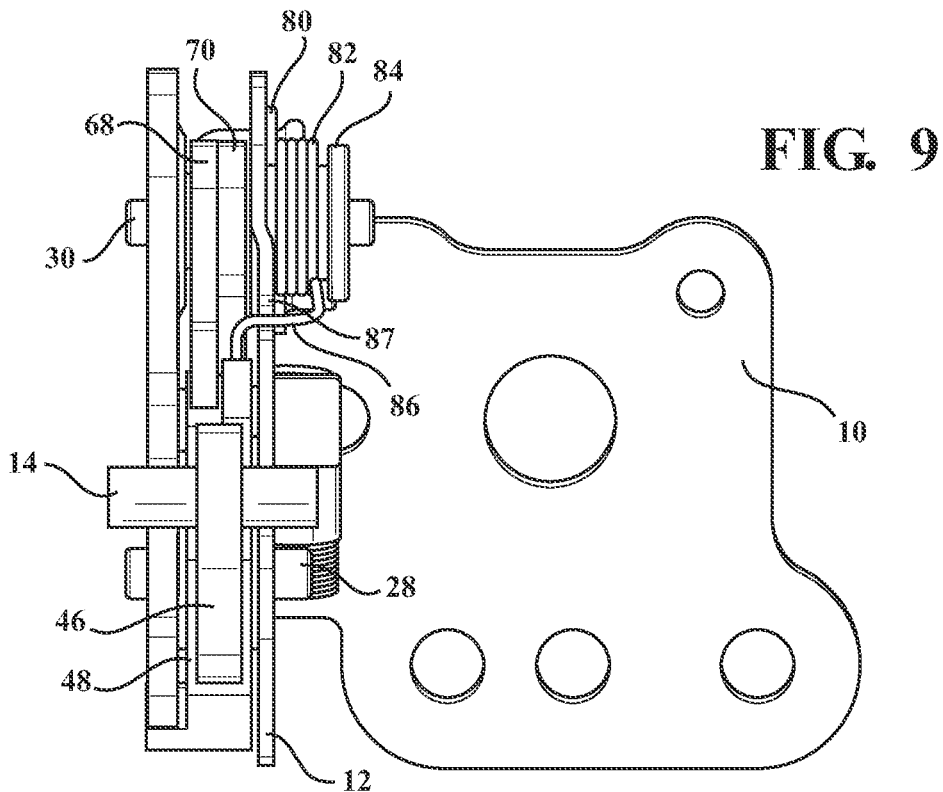
FIG. 9 is a ninety degree rotated side view of the assembled striker latch locking assembly in FIG. 8.

FIG. 8 corresponds to the latch and cinching cam position in FIG. 3 in a plan view representation similar to FIG. 2. FIG. 9 is a ninety degree rotated side view of the assembled striker latch locking assembly in FIG. 8 and FIG. 10 is a further ninety rotated plan view of the assembled striker latch locking assembly in FIG. 9 in a reversing fashion to that illustrated in FIG. 8.

Figure 11:
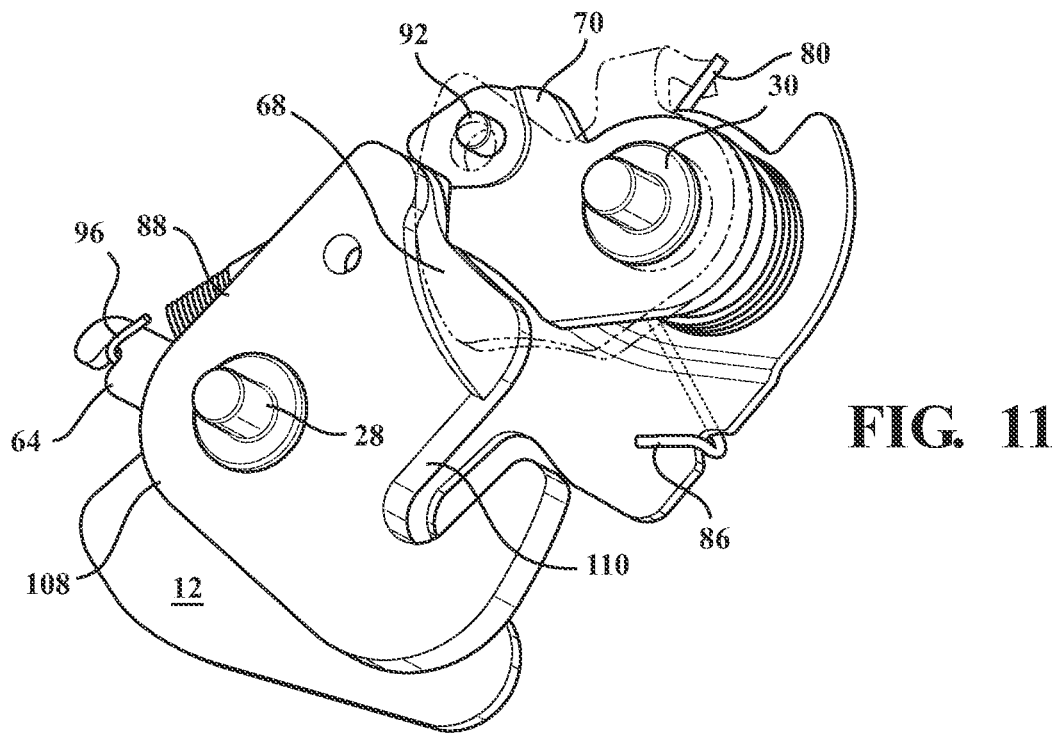
FIG. 11 is a related illustration of a further variant of the striker locking latch illustrating a reconfiguration of a fine blank hook design incorporating the striker receiving feature exhibited by a locally depressing the striker receiving area, along with further machining the receiving surface against which is contacted the cinching cam locking surface.
Figure 12:
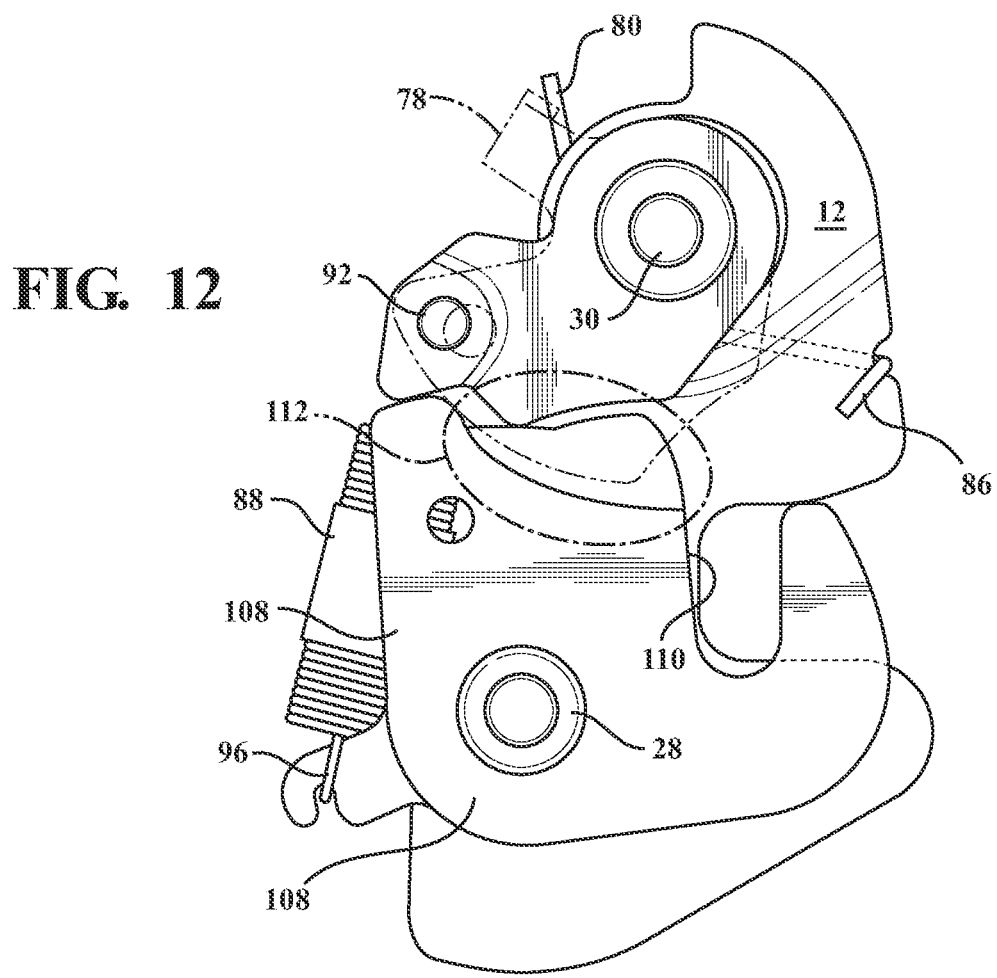
FIG. 12 is a plan view of the variant of FIG. 11 similar to the striker engaged position of FIG. 3 and illustrating the locking surface profile established between the cinching cam and hook.

FIG. 11 is a related illustration of a further variant of the striker locking latch, at 108, illustrating a reconfiguration of a fine blank hook design and incorporating the striker receiving feature, further at 110, exhibited by a locally depressing the striker receiving area, along with further machining the receiving surface against which is contacted the cinching cam locking surface. FIG. 12 is a plan view of the variant in FIG. 11, similar to the striker engaged position of FIG. 3, and illustrating the locking surface profile (see identified area at 112) established between the cinching cam 68 (depicted in phantom in FIGS. 11-12) and redesigned hook 108. Without limitation, the hook component can alternatively be reconfigured through the addition of a second plate (not shown) that is rotatably affixed thereto.

Referring now to FIG. 13, an assembled perspective of a striker locking latch assembly is generally shown at 200 according to a further non-limiting embodiment of the present invention. The operation of the latch assembly, as will be described in the related variants in FIGS. 13-31, is the same as described in reference to the initial embodiment of FIGS. 1-12, and provides a plurality of interchangeable part configurations. These include for such as the structural cam, spring rivet, mounting plate, and cover for adapting the latch to various mounting applications (such as bench seatback to wall and/or 40/60 percent seatback to seat bottom).

As will be further described, the plasticized overmolding of the hook is repeated in the additional embodiments, such further being variable in combination with a standard sized hook in order to provide for different striker clearances, with additional overmolding being provided upon the mounting plate in the region surrounding the striker receiving cavity. The release mechanism further envisions either of cable release options (see for example as previously depicted in FIG. 10), in addition to variations of a strap attachment to the structural cam.

With reference initially again to FIG. 13 and the exploded view of FIG. 14, the latch assembly 200 includes an "L" shaped mounting bracket having first 202 and second 204 angled sides. An angled edge portion 205 of the first side is also depicted which, as will be described, interfaces with a contoured edge of the hook in order to define a range of rotation therefore. A cover plate 206 is also provided and, along with the mounting plate sandwiches the interior package components including each a cinching cam 208, structural cam 210 and hook 212, the latter having an edge contour 213 with edge abutments 215/217 which define a range of rotation of the hook relative to the fixed angled edge portion 205 of the mounting plate (see also FIG. 20).

A pair of rivets 214 and 216 are provided within the package interior and respectively mount to aligning sets of apertures 218/220 and 222/224 respectively formed through the angled side 202 of the mounting plate and the outer cover plate 206. Aligning apertures, defined by continuous inner circular rim surfaces are defined at 226 for the cinching cam 208 and at 228 for structural cam 210 for receiving the rivet 214, with the narrowed diameter ends thereof mounting through the aligning pair of apertures 218/222, these further being staked such as shown at 219 and 221 in FIG. 13 to each of the mounting plate and cover plate.

A torsion spring 230 (also termed a first biasing component) is located on a forward facing side of the structural cam 210 and receives the rivet 214. The torsion spring 230 includes a first angled tang 232 which biases against an angled portion 234 of the cinching cam 208 and a second opposite end leg 236 which is captured by an outwardly angled cutout 238 of the cover plate 206.

The cinching cam 208 further includes a pair edge contoured surfaces, with a first abutting surface 240 defining a locking abutment with a projection 242 of the hook 212 (this also defining a first biasing contact between the cinching cam and the hook comparable to as shown by projection or edge protuberance 62 of hook 46 abutting surface 76 in FIG. 8).

As previously described, the cam locking surface profile 240 extends along an arc radially offset from a center point of rotation of said cinching cam, with the locking surface profile contacting the surface (e.g. edge protuberance 242) location of the hook 212.

A surface 244 of the cinching cam succeeds the first locking surface 240 and receives the hook projection 242 upon opening/unlocking motion of the hook 212 (this corresponding to FIG. 2 which depicts hook edge protuberance 62 contacting succeeding outer surface profile 102 of the cinching cam 68), and defines a second biasing contact established between the cinching cam and hook in the striker release/open position.

The hook 212 further includes an aperture defined by an inner circumferential continuous surface 248 for receiving the rivet 216, with the narrowed diameter ends thereof likewise being staked through the aligning apertures 220/224 in the mounting plate and cover plate. The hook 212 is again overmolded with a plasticized material, see at 250, with a further volume of plasticized material 252 also covering a central area of the mounting plate side 202 defining the striker receiving cavity.

Figure 18:
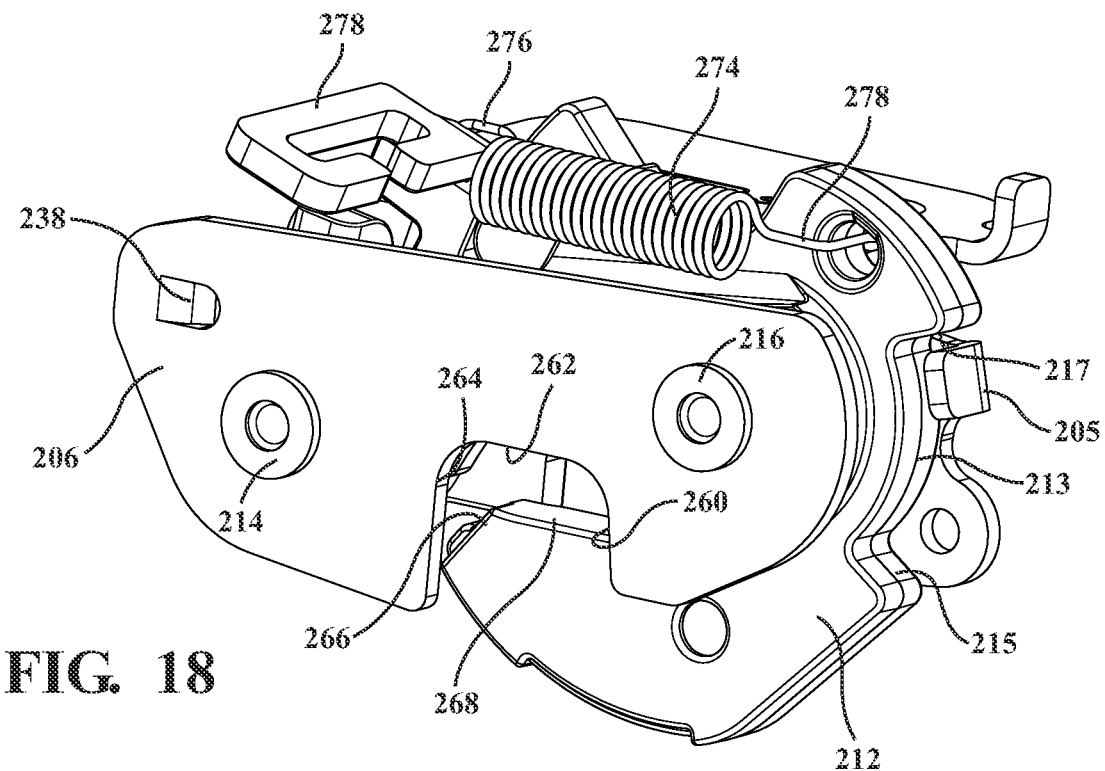
FIG. 18 is a perspective view of a non-limiting configuration of the striker locking latch assembly such as is utilized in the bench seatback to wall locking application of FIG. 16.

As with the initial embodiment, the inner angled side 202 of the mounting plate includes interconnected and cavity defining surfaces 254/256/258, with the cover plate 206 having an aligning arrangement of cavity defining surfaces 260/262/264, these again being arranged in an underside cavity defining alignment of the bracket and plate for seating the striker 14. An engaging portion of the hook 212 is directed in a generally crosswise fashion relative to the underside cavity (see as best shown in FIG. 18) and again includes a series of configured and recess defining interior surfaces with an entranceway location 266, inwardly extending surface 268, curved inner surface 270 and reverse backside extending striker receiving surface 272 (comparable to as shown at 50/52/54/56 in hook 46 in FIG. 4). In this fashion, the striker receiving profile defined within the hook 212 overlaps with the striker receiving cavities within the mounting plate and cover plates as depicted in FIG. 13.

A coiled extension spring 274 (see as compared to at 88 in FIG. 1) is provided (also termed a second biasing component) and again includes a first upper curled end 276 which engages the structural cam 208, with a lower multi angled leg 278 of the spring 274 engaging the hook 212 at a rotationally offset location relative to its pivoting aperture 248 (see aperture 277 in hook 212 through which spring leg 278 seats).

The structural cam 210 further includes an integrated strap receiving portion 279 for receiving a pull strap (not shown in this view) and such that, upon rotating the structural cam 210 and cinching cam 208 in a clockwise direction, shown at 280 as viewed from the exploded view of FIG. 14, the counterclockwise biasing force exerted by the torsion spring 230 on the cinching cam 208 is eventually overcome by the reverse biased pulling force exerted by the coil extension spring 274, at which point the hook 212 is rotated in a reverse counterclockwise direction so that its edge protuberance 242 travels from the cinching cam locking edge surface 240 to the succeeding release position edge surface 244.

Figure 15:
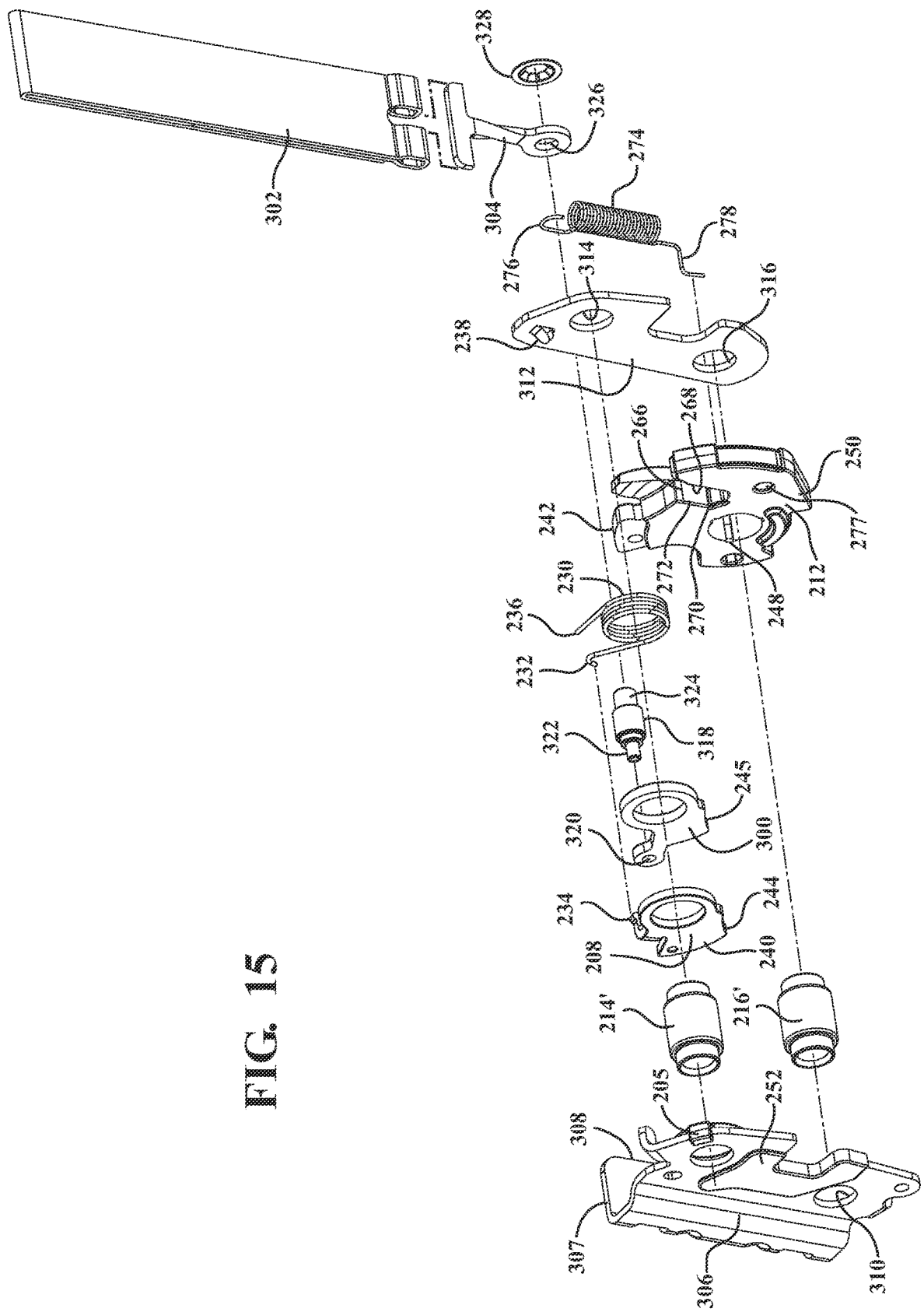
FIG. 15 is an exploded view of the striker locking latch assembly according to a still further non-limiting embodiment having a redesigned structural cam for attaching a release strap and bracket.

Proceeding to FIG. 15, illustrated is an exploded view of the striker locking latch assembly according to a still further non-limiting embodiment having a redesigned structural cam 300 for attaching a release strap 302 and bracket 304. Identical features from FIG. 14 are repetitively numbered and reconfigured bushings are redesigned as shown at 214' and 216'.

Mounting bracket with curved sides 306 and 307 is redesigned from that shown at 202/204 in FIG. 14 and includes continuous inner circumferential extending rims 308 and 310 defining apertures for staking the bushings 214'/216'. Cover plate is redesigned as shown at 312 with aligning inner rim defining apertures 314/316 which align with apertures 308/310.

A spring rivet 318 is depicted which engages a circumferentially offset aperture 320 defined in the structural cam via a first narrowed diameter end portion 322 of the rivet 310. A second opposite end portion 324 of the rivet 310 seats curled end 276 of the coil extension spring 274, the end portion 324 securing to an end formed aperture 326 in the release bracket 304. A push nut 328 mounts to the projecting end portion 324 on the reverse side of the release bracket aperture 326 to secure the release strap 302 to the structural cam 300.

The operation of the latch assembly is functionally identical to that previously described and, in this present instance, substitutes the cable release 98 depicted in FIG. 10 with the release strap 302, and by which pulling the strap 302 results in rotation of the structural cam 300 and cinching cam (again at 208), with resulting biasing force exerted by the torsion spring 230 on the cinching cam 208 being eventually overcome by the reverse biased pulling force exerted by the rotating structural cam on the coil extension spring 274, and again at which point the hook 212 is rotated in a reverse counterclockwise direction so that its edge protuberance 242 travels from the cinching cam locking edge surface 240 to the succeeding release position edge surface 244.

Figure 16:
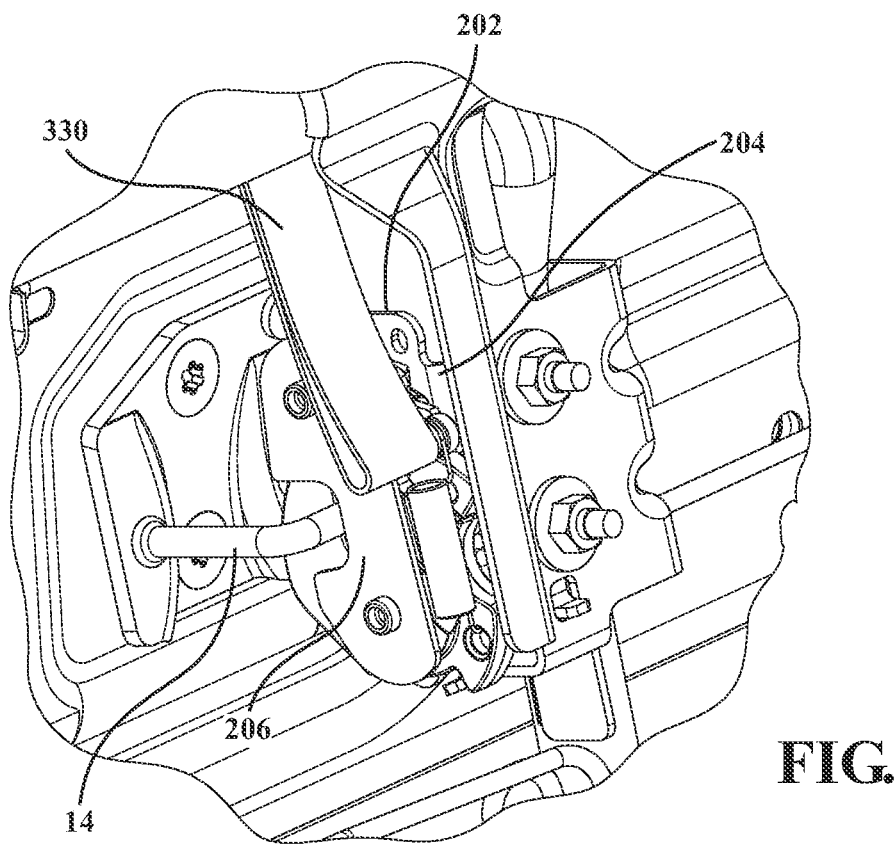
FIG. 16 is an environmental view depicting a bench seatback to wall locking application of the striker locking latch assembly of the present invention.
Figure 17:
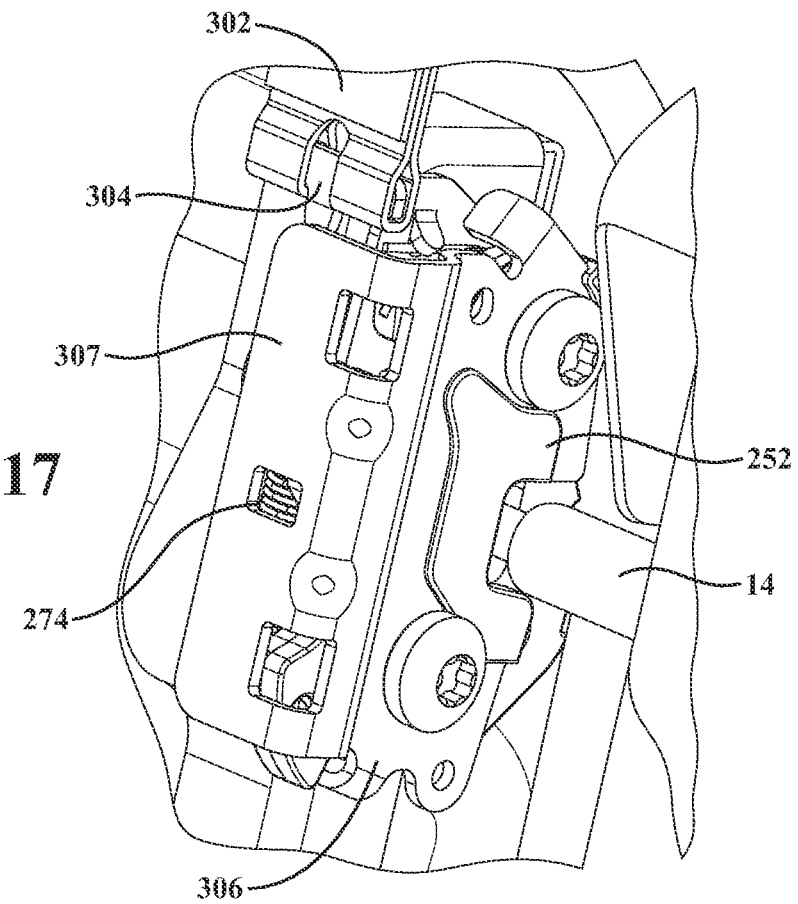
FIG. 17 is an environmental view of a 40% seatback to 60% seatback locking application of the striker locking latch assembly of the present invention.

FIG. 16 provides an environmental view depicting a bench seatback to wall locking application of the striker locking latch assembly of the present invention and which removes the structural cam such as depicted at 210 in FIG. 14. A release strap is shown at 330 and is secured to the integrated strap receiving portion 279. FIG. 17 presents an environmental view of a 40% seatback to 60% seatback locking application of the striker locking latch assembly shown in FIG. 15 of the present invention.

Figure 19:
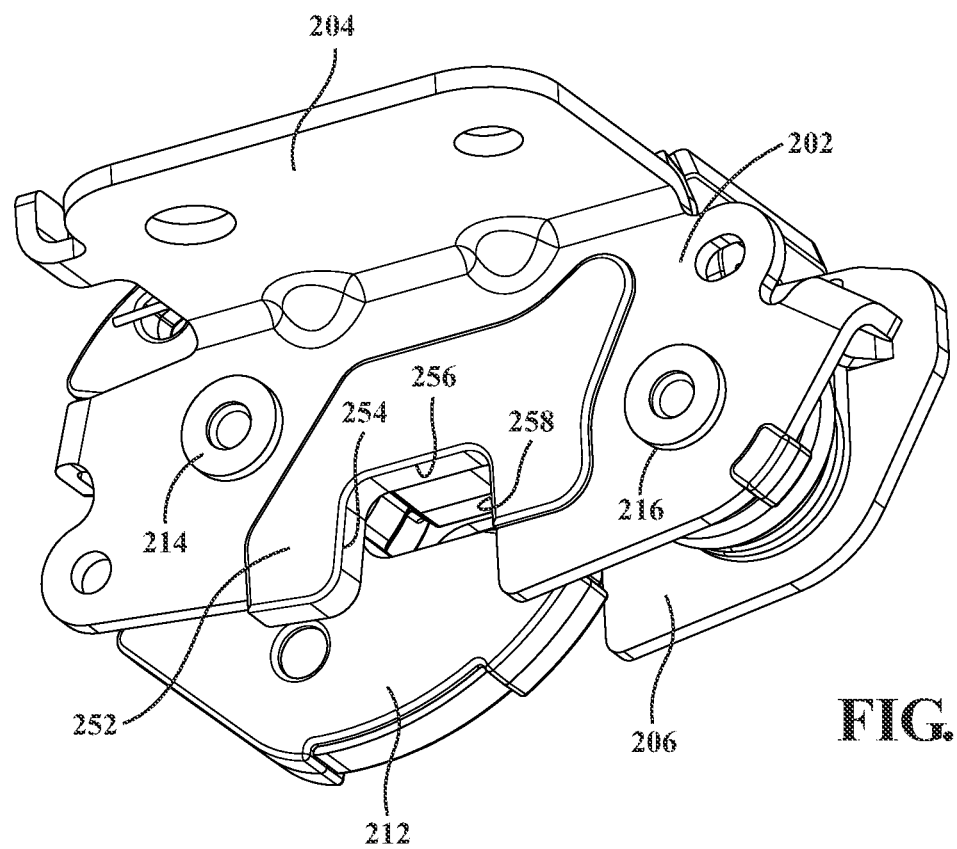
FIG. 19 is a rotated view of the striker locking latch assembly of FIG. 18 viewed from a reverse direction.

FIG. 18 is a perspective view of a non-limiting configuration of the striker locking latch assembly such as is utilized in the bench seatback to wall locking application of FIG. 16, with FIG. 19 depicting a rotated view of the striker locking latch assembly of FIG. 18, viewed from a reverse direction.

Figure 20:
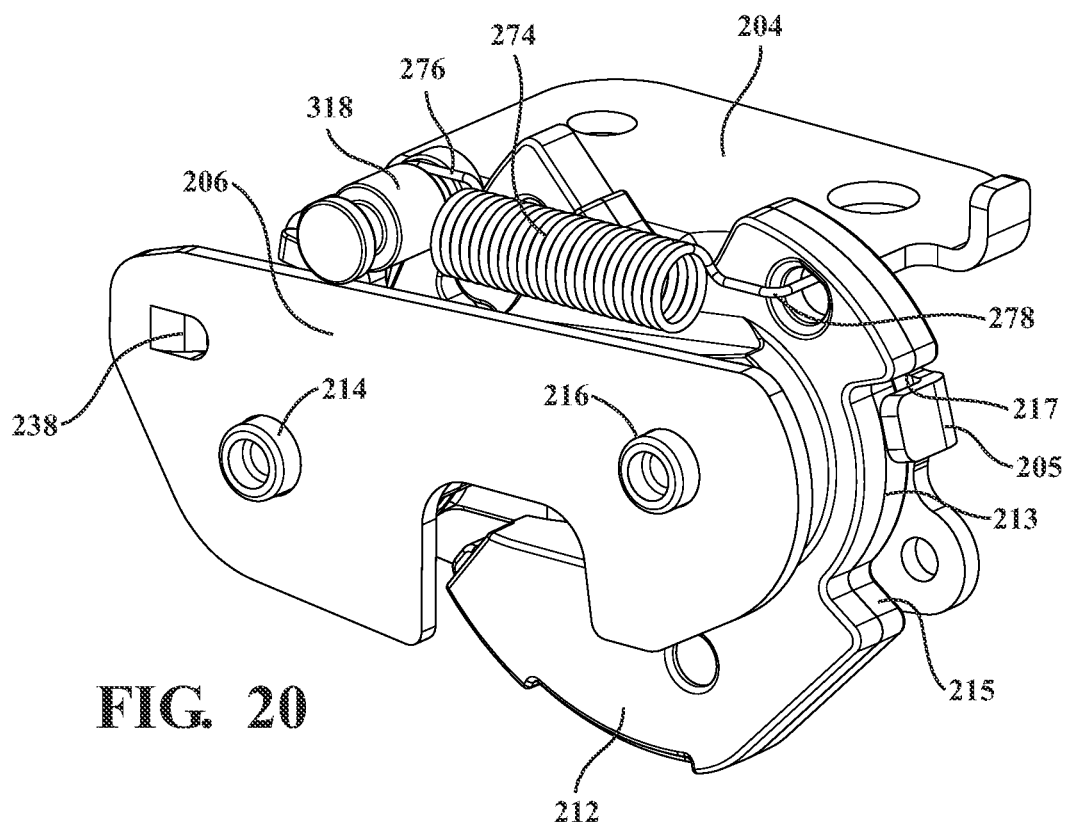
FIG. 20 is a perspective view of a striker locking latch assembly according to a still further embodiment incorporating an "L" shaped overmolded mounting plate such as depicted in FIG. 14.
Figure 21:
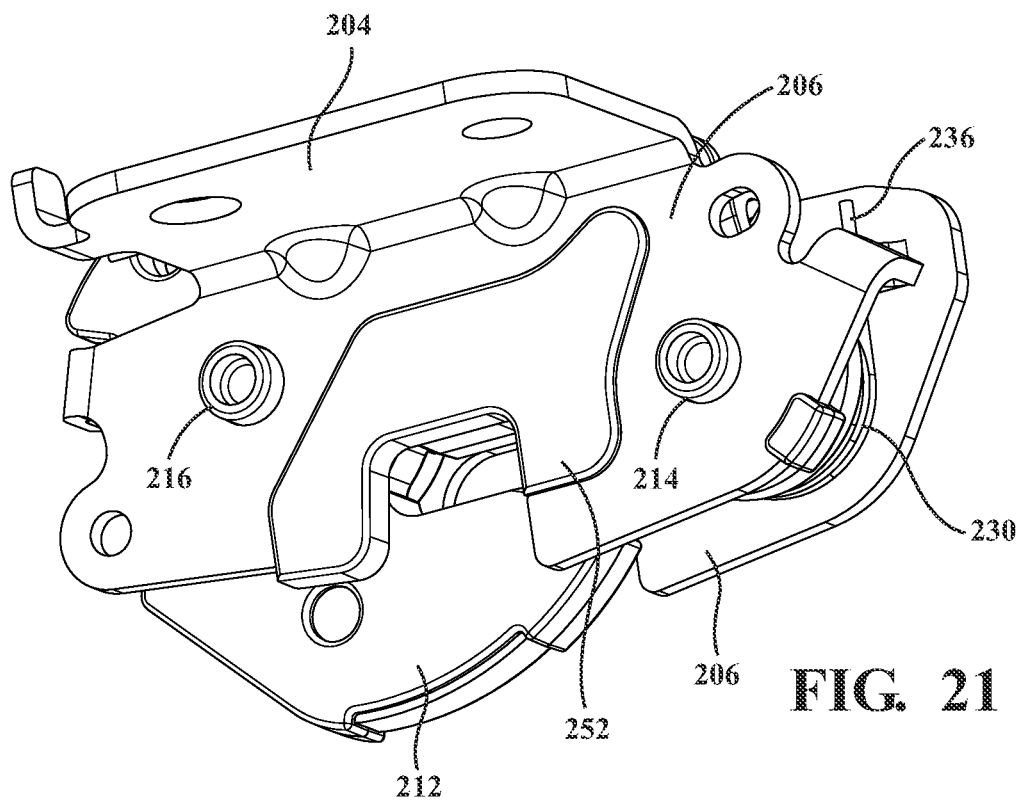
FIG. 21 is a rotated view of the striker locking latch assembly of FIG. 20 viewed from a reverse direction.
Figure 22:
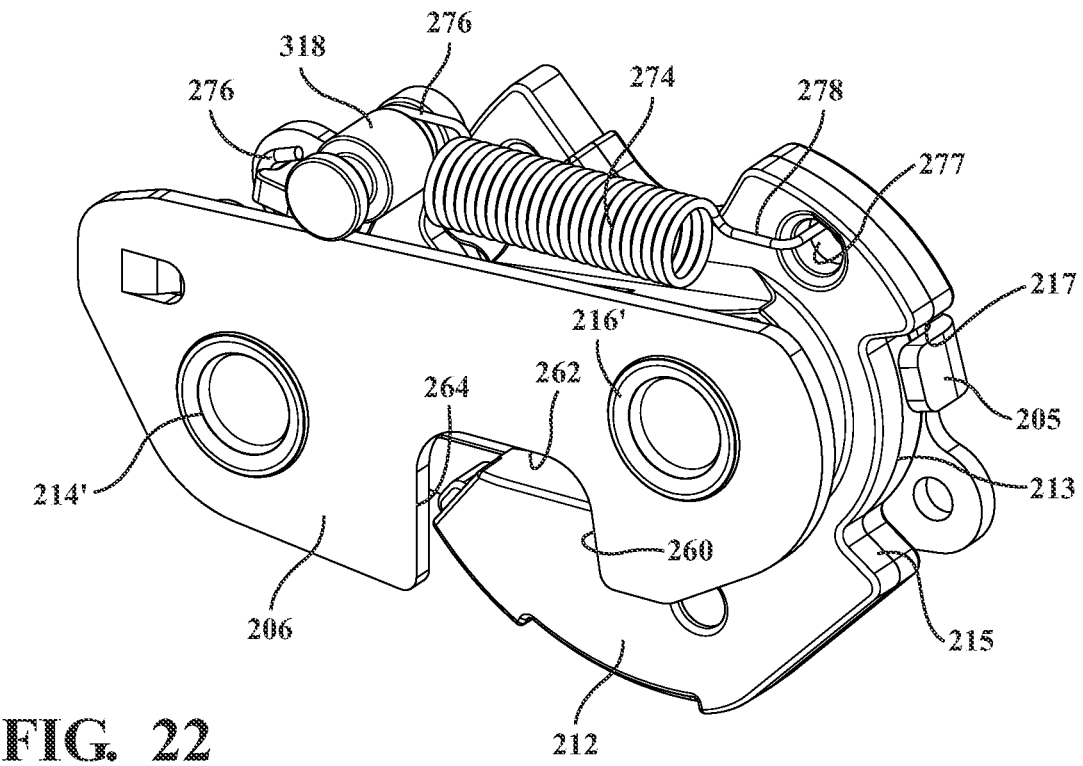
FIG. 22 is a perspective view of a striker locking latch assembly according to a further non-limiting embodiment and including a combination of striker cinch, thru bushings and nail head rivet features.
Figure 23:
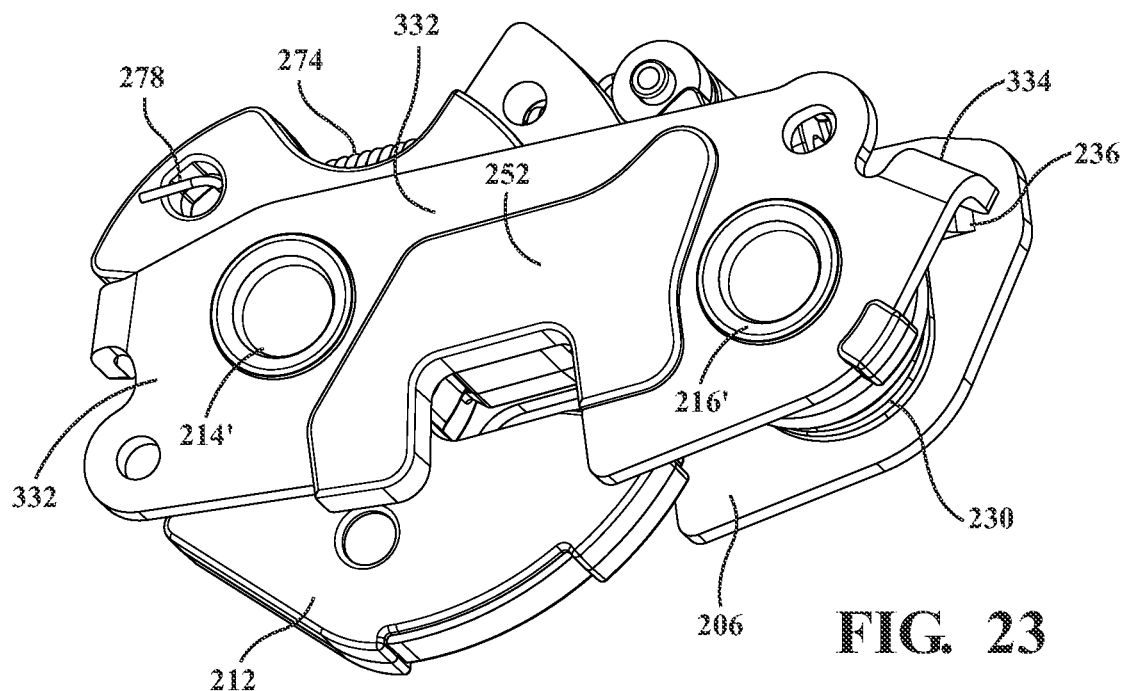
FIG. 23 is a rotated view of the striker locking latch assembly of FIG. 22 viewed from a reverse direction.

FIG. 20 is a perspective view of a striker locking latch assembly according to a still further embodiment incorporating an "L" shaped overmolded mounting plate such as depicted in FIG. 14. FIG. 21 provides a rotated view of the striker locking latch assembly of FIG. 20, viewed from a reverse direction;

FIG. 22 presents a perspective view of a striker locking latch assembly according to a further non-limiting embodiment and including a combination of striker cinch, thru bushings 214'/216' and a nail head rivet features, such as previously referenced at 318. FIG. 23 is a rotated view of the striker locking latch assembly of FIG. 22 viewed from a reverse direction and depicts a revised mounting plate 332 substituting for the prior variations shown in FIG. 13 (204/202) and FIG. 15 (306/307). The plate 332 includes an angled edge 334 which biases the extending leg 236 of the torsion spring 230, such as in substitution of the angled internal portion 238 associated with the cover plate 206 depicted in FIG. 14.

Figure 24:
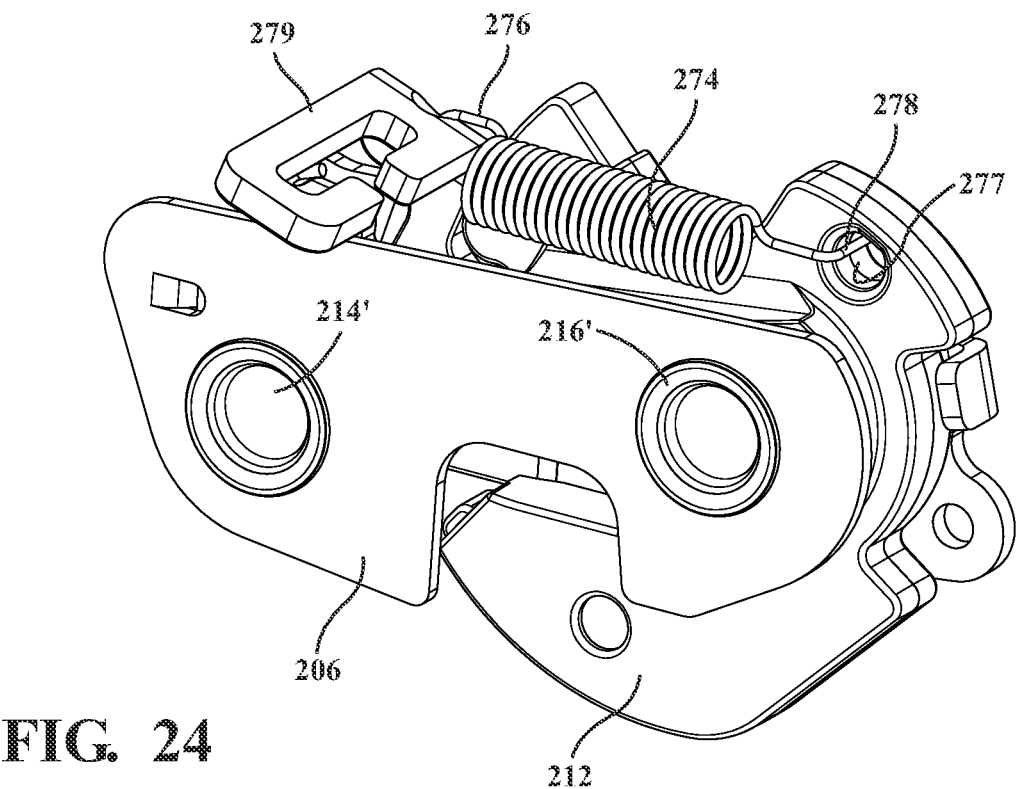
FIG. 24 is a perspective view of a striker locking latch assembly according to a further non-limiting embodiment and including a combination of striker cinch, thru bushings and direct strap attachment.
Figure 25:
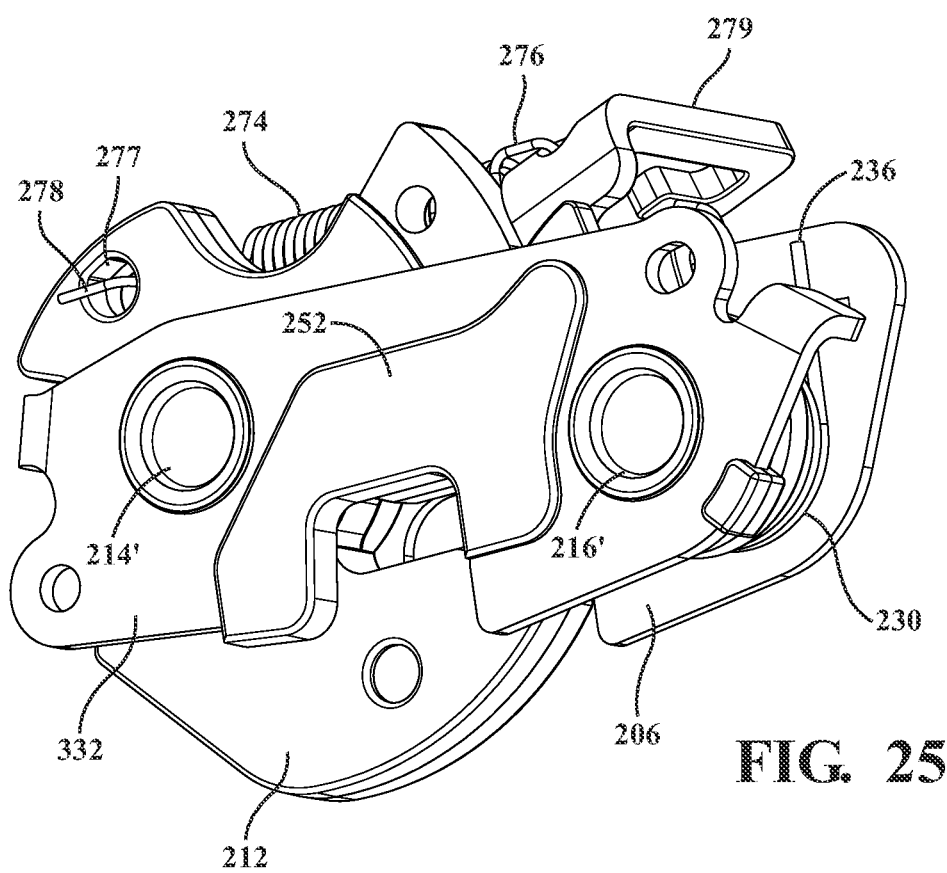
FIG. 25 is a rotated view of the striker locking latch assembly of FIG. 24 viewed from a reverse direction.

FIG. 24 presents a perspective view of a striker locking latch assembly according to a further non-limiting embodiment and including a combination of striker cinch, thru bushings and direct strap attachment according to a still further configuration, FIG. 25 is a rotated view of the striker locking latch assembly of FIG. 24 viewed from a reverse direction.

Figure 26:
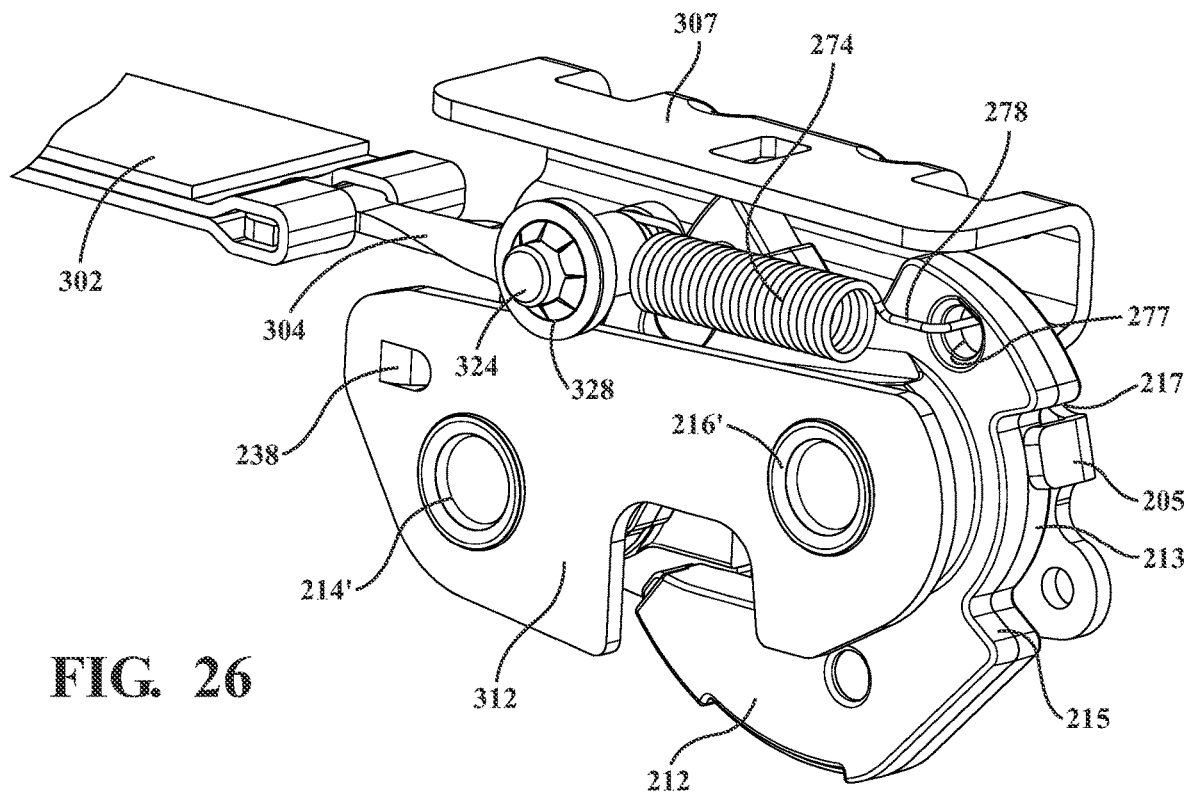
FIG. 26 is a perspective view of a striker locking latch assembly according to a further non-limiting embodiment and including a combination of striker cinch, thru bushings, protective flange and strap attachment such as previously depicted in FIG. 15.
Figure 27:
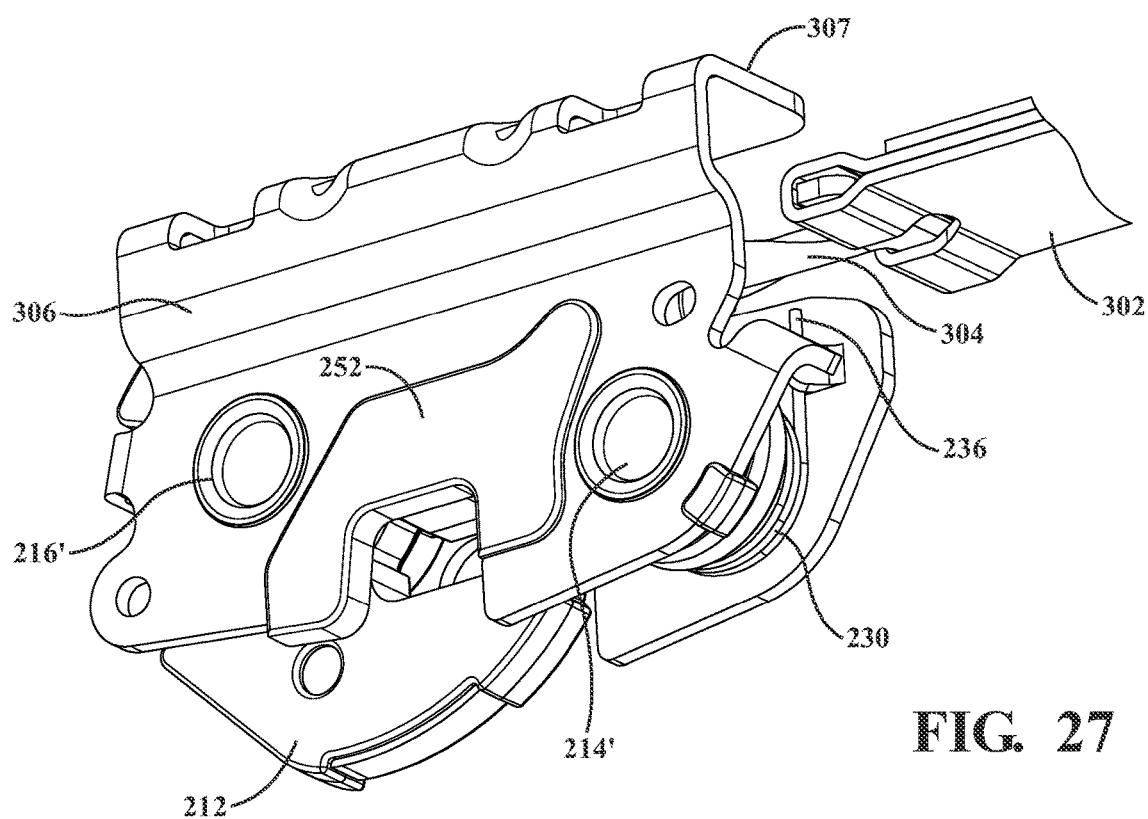
FIG. 27 is a rotated view of the striker locking latch assembly of FIG. 26 viewed from a reverse direction.

FIG. 26 presents a perspective view of a striker locking latch assembly according to a further non-limiting embodiment and including a combination of striker cinch, thru bushings, protective flange and strap attachment such as previously depicted in FIG. 15. FIG. 27 is a rotated view of the striker locking latch assembly of FIG. 26 viewed from a reverse direction.

Figure 28:
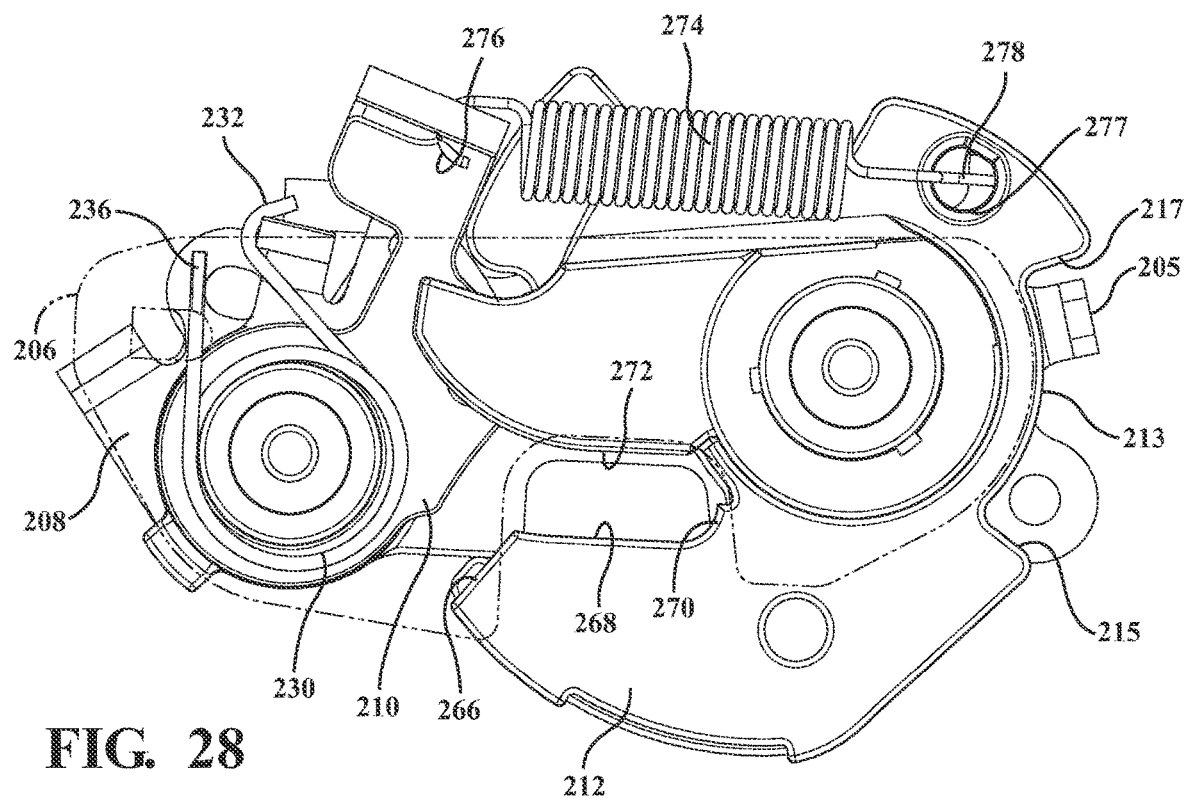
FIG. 28 is genericized plan view depiction of a version of a striker locking latch with an "L" shaped structural cam with cover plate shown in phantom in a locked position.
Figure 29:
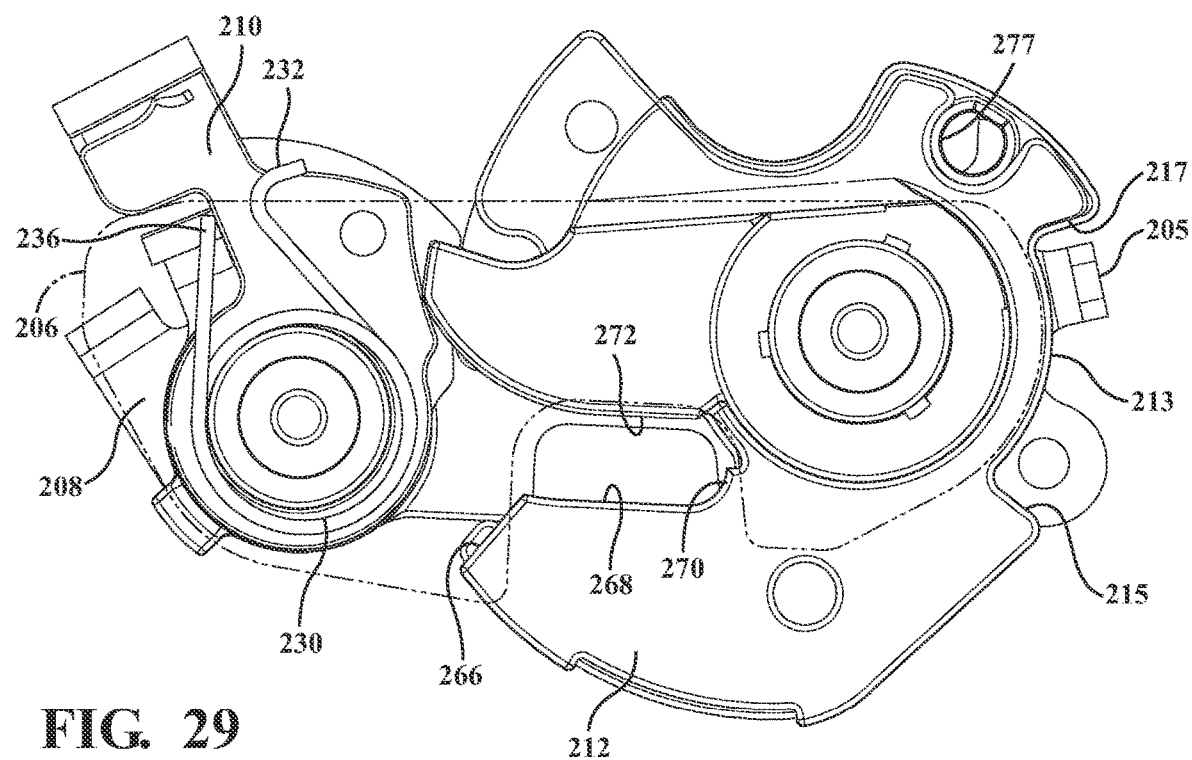
FIG. 29 presents a succeeding view to FIG. 28 with extension spring removed to better show and depicting a minimal range of structural cam rotation for preceding striker release of the hook.

FIG. 28 presents a genericized plan view depiction of a version of a striker locking latch with an "L" shaped structural cam (see at 210 in FIGS. 29-31) with cover plate 206 shown in phantom in a locked position. FIG. 29 presents a succeeding view to FIG. 28, with the extension spring 274 removed to better show and depicting a minimal range of structural cam 210 rotation for preceding striker release of the hook 212.

Figure 30:
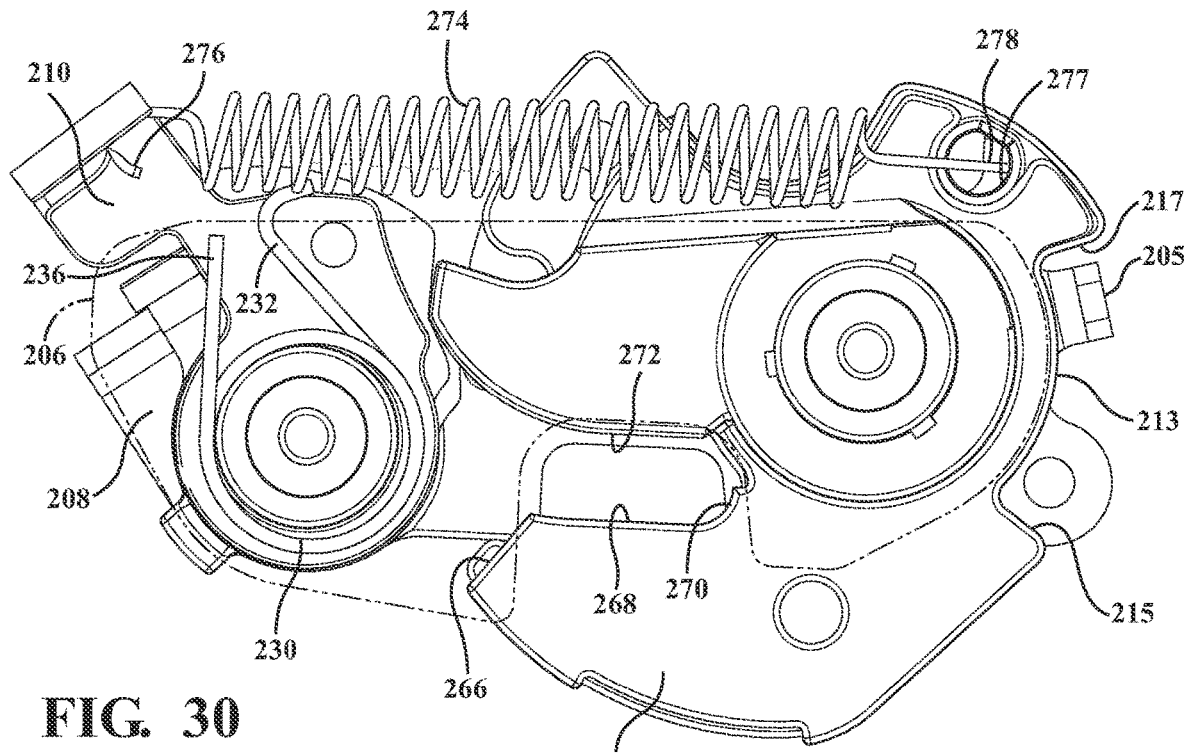
FIG. 30 succeeds FIG. 29 and depicts a maximum rotation of the structural cam and cinching cam at the point of unlocking rotation of the hook.
Figure 31:
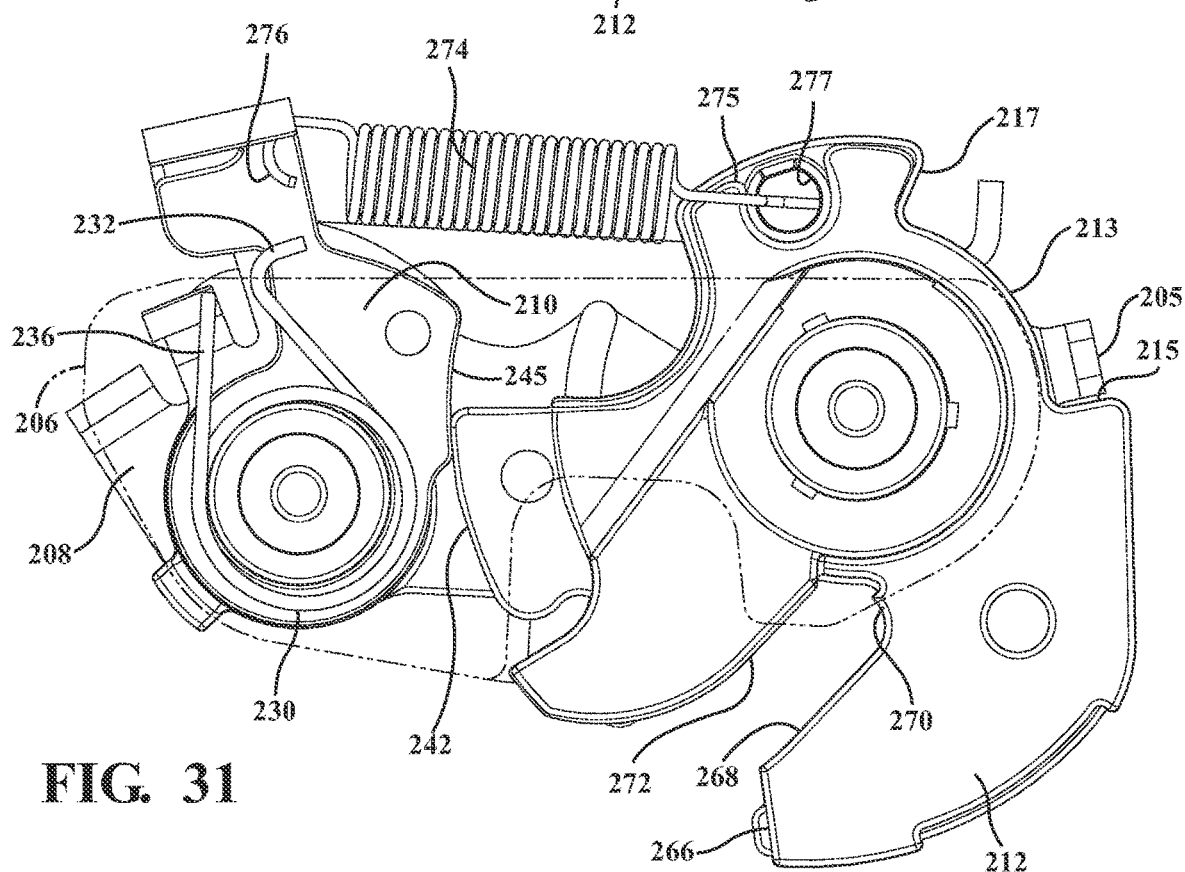
FIG. 31 is a succeeding depiction to FIG. 30 showing the hook in the rotated and unlocked position for releasing the striker.

FIG. 30 succeeds FIG. 29 and depicts a maximum rotation of the structural cam 210 and cinching cam 208 at the point of unlocking rotation of the hook and FIG. 31 presents a succeeding depiction to FIG. 30 showing the hook in the rotated and unlocked position for releasing the striker.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A striker locking latch assembly, comprising:
   a mounting bracket and a cover plate secured together by first and second rotationally supporting and cylindrical shaped components to define a package interior, said first cylindrical shaped component rotatably supporting a structural cam and a cinching cam, said second cylindrical shaped component rotatably supporting a hook adapted to engage a striker when seated within an underside cavity defined between said bracket and plate;

said cinching cam further including first and second contoured surfaces defining first and second biasing contacts with an edge protuberance of said hook, said first contoured surface extending along an arc radially offset from a center point of rotation of said cinching cam;

said first biasing component influencing said cinching cam in a first direction for maintaining a first biasing contact with said hook for engaging with the striker;

said second biasing component extending between said structural cam and a rotationally offset location of said hook;

a release bracket supporting a pull strap and including an end formed aperture aligning with an offset aperture defined in said structural cam for receiving a mounting rivet; and upon said structural cam being pivoted by said pull strap into engagement with said cinching cam and against said first biasing component, continued pivotal actuation of said structural cam and cinching cam causing said second biasing component to pivot said hook out of contact with the striker in a second release position at which said cinching cam establishes a second biasing contact with said hook.

2. The striker locking latch assembly of claim 1, said first biasing component further comprising a torsional spring having a first angled tang which biases against an angled portion of said cinching cam and a second opposite end leg which is captured by an outwardly angled cutout of said cover plate.

3. The striker locking latch assembly of claim 1, said second biasing component further comprising an extension coil spring having a first upper curled end which engages the structural cam, with a lower multi angled leg of said coil spring engaging said hook at a rotationally offset location relative to it pivoting support with said second cylindrical shaped component.

4. The striker locking latch assembly of claim 1, further comprising aligning sets of apertures respectively formed through an angled side of said mounting plate and said cover plate and through which are secured said cylindrical shaped support components.

5. The striker locking latch assembly of claim 1, further comprising a plasticized overmolding applied to said hook.

6. The striker locking latch assembly of claim 5, further comprising a further plasticized overmolding applied to said mounting plate surrounding said underside striker receiving cavity.

7. A striker locking latch assembly, comprising:
an "L" shaped mounting bracket having first and second sides and a cover plate which are secured together by first and second rotationally supporting and cylindrical shaped components to define a package interior, said first cylindrical shaped component rotatably supporting a structural cam and a cinching cam, said second cylindrical shaped component rotatably supporting a hook having a striker receiving location adapted to engage a striker when seated within an underside cavity defined between said bracket and plate;

a first volume of a plasticized material applied to said hook including around said striker receiving location;

a second volume of a plasticized material applied to said first angled side covering a central area defining a striker receiving cavity, said first and second volumes of plasticized material providing for variances in striker dimension and clearance while contacting the striker at any point of engagement along said hook or mounting bracket;

a first biasing component influencing said cinching cam in a first direction for maintaining a first biasing contact with said hook to engage with the striker;

a second biasing component extending between said structural cam and a rotationally offset location of said hook; and upon said structural cam being pivoted into engagement with said cinching cam and against said first biasing component, continued pivotal actuation of said structural cam and cinching cam causing said second biasing component to pivot said hook out of contact with the striker in a second release position at which said cinching cam establishes a second biasing contact with said hook.

8. The striker locking latch assembly of claim 7, said cinching cam further comprising first and second contoured surfaces defining said first and second biasing contacts with an edge protuberance of said hook, said first contoured surface extending along an arc radially offset from a center point of rotation of said cinching cam.

9. The striker locking latch assembly of claim 7, said striker receiving location of said hook including a series of configured and recess defining interior surfaces with an entranceway location, and inwardly extending surface, a curved inner surface and a reverse backside extending striker receiving surface.

10. The striker locking latch assembly of claim 7, said first biasing component further comprising a torsional spring.

11. The striker locking latch assembly of claim 10, said torsional spring further comprising a first angled tang which biases against an angled portion of said cinching cam and a second opposite end leg which is captured by an outwardly angled cutout of said cover plate.

12. The striker locking latch assembly of claim 7, said second biasing component further comprising an extension coil spring.

13. The striker locking latch assembly of claim 12, said extension coil spring further comprising a first upper curled end which engages the structural cam, with a lower multi angled leg of said coil spring engaging said hook at a rotationally offset location relative to it pivoting support with said second bushing.

14. The striker locking latch assembly of claim 7, further comprising aligning sets of apertures respectively formed through an angled side of said mounting bracket and said cover plate and through which are secured said rotationally supporting cylindrical shaped components.

15. The striker locking latch assembly of claim 7, further comprising a rivet secured to a rotationally offset location of said structural cam for securing an end of said second biasing component.

16. The striker locking latch assembly of claim 15, further comprising a cable, wire loop or handle securing to and extending from said rivet.

17. The striker locking latch assembly of claim 7, further comprising any of a pull strap cable, wire loop or handle securing to and extending from said structural cam.

* * * * *